(12) United States Patent
Arai et al.

(10) Patent No.: US 12,440,702 B2
(45) Date of Patent: Oct. 14, 2025

(54) RADIATION TREATMENT SYSTEM COMPRISING A CT APPARATUS, A TREATMENT PLANNING APPARATUS, AND A RADIATION CONTROL APPARATUS, RADIATION CONTROL METHOD, AND STORAGE MEDIUM

(71) Applicant: ANZAI MEDICAL CO., LTD., Tokyo (JP)

(72) Inventors: Hirofumi Arai, Tokyo (JP); Takeshi Sasaki, Tokyo (JP)

(73) Assignee: Anzai Medical Co., Ltd., Tokyo (JP)

( * ) Notice: Subject to any disclaimer, the term of this patent is extended or adjusted under 35 U.S.C. 154(b) by 261 days.

(21) Appl. No.: 18/135,924

(22) Filed: Apr. 18, 2023

(65) Prior Publication Data
US 2023/0338750 A1    Oct. 26, 2023

(30) Foreign Application Priority Data
Apr. 26, 2022 (JP) .................. 2022-072085

(51) Int. Cl.
*A61N 5/10*    (2006.01)

(52) U.S. Cl.
CPC .......... *A61N 5/1068* (2013.01); *A61N 5/103* (2013.01); *A61N 5/1037* (2013.01); *A61N 5/1045* (2013.01); *A61N 5/1047* (2013.01); *A61N 5/1048* (2013.01); *A61N 5/1049* (2013.01); *A61N 5/1081* (2013.01);
(Continued)

(58) Field of Classification Search
CPC ........ A61N 5/10; A61N 5/103; A61N 5/1031; A61N 5/1037; A61N 5/1042; A61N 5/1045; A61N 5/1047; A61N 5/1048; A61N 5/1049; A61N 2005/1061; A61N 2005/1062; A61N 5/1064; A61N 5/1065; A61N 5/1067; A61N 5/1068; A61N 5/1071; A61N 2005/1072; A61N 2005/1074; A61N 5/1081
USPC .......................................................... 378/65
See application file for complete search history.

(56) References Cited

U.S. PATENT DOCUMENTS

| 5,740,225 A * | 4/1998 | Nabatame .............. A61N 5/103 378/65 |
| 7,158,610 B2 * | 1/2007 | Mostafavi ............... G06T 17/00 378/98.12 |

(Continued)

FOREIGN PATENT DOCUMENTS

| CN | 105615909 A | 6/2016 |
| JP | 2022-024401 A | 2/2022 |

OTHER PUBLICATIONS

Office Action dated Dec. 1, 2023 issued over the corresponding Great Britain Patent Application No. 2305752.4.

*Primary Examiner* — Allen C. Ho
(74) *Attorney, Agent, or Firm* — Carrier, Shende & Associates P.C.; Joseph P. Carrier; Jeffrey T. Gedeon

(57) ABSTRACT

A plurality of shift images are generated by shifting a fluoroscopic image by a prescribed increment within a prescribed range in a craniocaudal direction. Then, a normalized correlation coefficient between a DRR image and each of the plurality of shift images is calculated. Next, a shift amount of the shift image corresponding to the largest normalized correlation coefficient among the plurality of normalized correlation coefficients is determined to be the positional deviation.

18 Claims, 21 Drawing Sheets

(52) U.S. Cl.
CPC ............... *A61N 2005/1061* (2013.01); *A61N 2005/1062* (2013.01); *A61N 2005/1074* (2013.01)

(56) References Cited

U.S. PATENT DOCUMENTS

| | | | | |
|---|---|---|---|---|
| 7,570,738 B2* | 8/2009 | Khamene | ............... | A61B 6/032 378/65 |
| 7,672,429 B2* | 3/2010 | Urano | ............... | A61N 5/1049 378/65 |
| 7,756,567 B2* | 7/2010 | Kuduvalli | ............ | A61N 5/1049 606/130 |
| 7,894,649 B2* | 2/2011 | Fu | ............... | A61N 5/1049 378/65 |
| 7,945,021 B2* | 5/2011 | Shapiro | ............... | A61N 5/1048 378/65 |
| 8,086,004 B2* | 12/2011 | Kuduvalli | ............ | A61N 5/1075 382/128 |
| 8,295,435 B2* | 10/2012 | Wang | ............... | A61N 5/1082 378/65 |
| 8,571,639 B2* | 10/2013 | Mostafavi | ............ | A61N 5/1048 600/407 |
| 8,831,303 B2* | 9/2014 | Villain | ............... | G06T 5/50 382/128 |
| 8,965,096 B2* | 2/2015 | Yamada | ............... | A61B 6/5288 378/62 |
| 9,008,398 B2* | 4/2015 | Mostafavi | ............... | G06T 5/00 382/131 |
| 9,192,786 B2* | 11/2015 | Yan | ............... | A61N 5/1049 |
| 9,616,251 B2* | 4/2017 | Filiberti | ............... | A61N 5/10 |
| 9,830,718 B2* | 11/2017 | Hirai | ............... | G06T 15/08 |
| 10,143,431 B2* | 12/2018 | Hirai | ............... | A61N 5/1049 |
| 10,342,996 B2* | 7/2019 | Jordan | ............... | A61N 5/1039 |
| 10,384,082 B2* | 8/2019 | Berlinger | ............ | A61N 5/1045 |
| 10,517,544 B2* | 12/2019 | Taguchi | ............... | A61B 6/12 |
| 10,532,224 B2* | 1/2020 | Jordan | ............... | A61N 5/1039 |
| 10,625,099 B2* | 4/2020 | Takahashi | ............ | A61N 5/1049 |
| 10,702,713 B2* | 7/2020 | Mori | ............... | A61N 5/1049 |
| 10,713,801 B2* | 7/2020 | Jordan | ............... | A61N 5/1049 |
| 10,737,117 B2* | 8/2020 | Mori | ............... | A61N 5/1065 |
| 10,769,467 B2* | 9/2020 | Hirai | ............... | G06V 20/647 |
| 10,835,762 B2* | 11/2020 | Mori | ............... | A61N 5/1067 |
| 10,940,331 B2* | 3/2021 | Mori | ............... | A61N 5/1064 |
| 10,952,695 B2* | 3/2021 | Mori | ............... | A61B 6/487 |
| 11,097,129 B2* | 8/2021 | Sakata | ............... | A61N 5/1049 |
| 11,141,126 B2* | 10/2021 | Mori | ............... | G06T 7/20 |
| 11,173,324 B2* | 11/2021 | Paysan | ............... | G06T 11/008 |
| 11,712,582 B2* | 8/2023 | Miyazaki | ............ | A61N 5/1049 378/65 |
| 12,059,579 B2* | 8/2024 | Karasawa | ............ | A61N 5/1049 |
| 12,165,321 B2* | 12/2024 | Sakata | ............... | A61B 6/487 |
| 2014/0119623 A1 | 5/2014 | Mostafavi et al. | | |
| 2016/0148401 A1 | 5/2016 | Hirai et al. | | |

* cited by examiner

RADIATION TREATMENT SYSTEM COMPRISING A CT APPARATUS, A TREATMENT PLANNING APPARATUS, AND A RADIATION CONTROL APPARATUS, RADIATION CONTROL METHOD, AND STORAGE MEDIUM

CROSS-REFERENCE TO RELATED APPLICATIONS

This application is based upon and claims the benefit of priority from Japanese Patent Application No. 2022-072085 filed on Apr. 26, 2022, the contents of which are incorporated herein by reference.

BACKGROUND OF THE INVENTION

Field of the Invention

The present invention relates to a radiation control apparatus, a radiation treatment system, a radiation control method, and a storage medium.

Description of the Related Art

JP 2022-024401 A discloses a radiation treatment system. The radiation treatment system includes a treatment planning apparatus, a radiation treatment apparatus, a fluoroscopic image generation apparatus, and a radiation control apparatus.

The treatment planning apparatus creates a treatment plan for a subject. The radiation treatment apparatus includes a gantry and a radiation beam source. The radiation beam source is mounted on the gantry. During the radiation treatment, the subject is arranged on a rotational axis of the gantry. When the gantry rotates around the rotational axis, the radiation beam source radiates the radiation beam onto a treatment target location such as a tumor inside the subject. Due to this, radiation treatment is performed on the tumor. The fluoroscopic image generation apparatus is arranged to be approximately coaxial with the rotational axis. The fluoroscopic image generation apparatus generates a fluoroscopic image of the subject positioned on the rotational axis.

The treatment plan includes a computed tomography (CT) image at a specific respiratory phase of the subject, and isocenter coordinates for specifying the irradiation position of the radiation beam at this respiratory phase of the subject. Furthermore, when performing the radiation treatment, there are many cases where the position of the tumor fluctuates periodically according to the breathing of the subject.

Therefore, the radiation control apparatus controls the radiation of the radiation beam from the radiation beam source toward the subject, based on the treatment plan and the fluoroscopic image. Specifically, the radiation control apparatus generates a DRR (Digitally Reconstructed Radiography) image for each prescribed angle of the gantry, based on the CT image and the isocenter coordinates. Furthermore, the radiation control apparatus calculates positional deviation between a position of the diaphragm of the subject in the DRR image and a position of the diaphragm of the subject in the fluoroscopic image, for the same rotational angle of the gantry. More specifically, the radiation control apparatus generates two new DRR images by shifting the DRR image in each of a direction of the head and a direction of the feet of the subject. Next, the radiation control apparatus calculates a normalized correlation coefficient between the fluoroscopic image and each of the two new shifted DRR images. If the normalized correlation coefficient between the original DRR image and the fluoroscopic image is greater than each of the normalized correlation coefficients between the two new DRR images and the fluoroscopic image, radiation of the radiation beam from the radiation beam source to the subject is permitted.

SUMMARY OF THE INVENTION

In order to more accurately control the radiation of the radiation beam from the radiation beam source toward the subject, it is desirable to calculate the positional deviation between the position of the diaphragm of the subject in the DRR image and the position of the diaphragm of the subject in the fluoroscopic image with higher accuracy.

The present invention has been devised to solve the above problem.

A first aspect of the present invention is a radiation control apparatus that controls radiation of a radiation beam from a radiation beam source toward a subject, based on a treatment plan for the subject and a fluoroscopic image of the subject, wherein: the treatment plan includes a CT image at a specific respiratory phase of the subject and isocenter coordinates for specifying an irradiation position of the radiation beam at the specific respiratory phase of the subject; the radiation beam source is mounted on a gantry, and is capable of irradiating the subject with the radiation beam when the subject is positioned on a rotational axis of the gantry; the fluoroscopic image is generated by a fluoroscopic image generation apparatus arranged approximately coaxially with the rotational axis; the radiation control apparatus comprises: a treatment plan acquiring section that acquires the treatment plan; a DRR image generating section that generates a DRR image of the subject for each prescribed angle of the gantry, based on the CT image and the isocenter coordinates included in the acquired treatment plan; a fluoroscopic image acquiring section that acquires the fluoroscopic image and the rotational angle of the gantry at the time when the fluoroscopic image was generated; a positional deviation calculating section that calculates positional deviation between a position of a diaphragm of the subject in the generated DRR image and a position of the diaphragm of the subject in the acquired fluoroscopic image, for the same rotational angle; and a radiation permission determining section that permits radiation of the radiation beam from the radiation beam source toward the subject, when the positional deviation is less than or equal to a prescribed value; and the positional deviation calculating section: generates a plurality of shift images by shifting the fluoroscopic image by a prescribed increment along a craniocaudal direction of the subject, within a prescribed range in the craniocaudal direction; calculates a normalized correlation coefficient between the DRR image and each of the plurality of generated shift images; and determines a shift amount of the shift image corresponding to the largest normalized correlation coefficient among the plurality of calculated normalized correlation coefficients, relative to the DRR image in the craniocaudal direction, to be the positional deviation.

A second aspect of the present invention is a radiation treatment system comprising: a radiation treatment apparatus that includes a treatment planning apparatus that creates a treatment plan for radiation treatment of a subject, a gantry and a radiation beam source mounted on the gantry, and is capable of irradiating the subject with the radiation beam from the radiation beam source when the subject is positioned on a rotational axis of the gantry; a fluoroscopic image generation apparatus that is arranged approximately coaxially with the rotational axis and generates a fluoroscopic image of the subject; and a radiation control apparatus that controls radiation of the radiation beam from the radiation beam source toward the subject, based on the treatment plan and the fluoroscopic image, wherein: the treatment plan includes a CT image at a specific respiratory phase of the subject and isocenter coordinates for specifying an irradiation position of the radiation beam at the specific respiratory phase of the subject; the radiation control apparatus includes: a treatment plan acquiring section that acquires the treatment plan from the treatment planning apparatus; a DRR image generating section that generates a DRR image of the subject for each prescribed angle of the gantry, based on the CT image and the isocenter coordinates included in the acquired treatment plan; a fluoroscopic image acquiring section that acquires the fluoroscopic image and the rotational angle of the gantry at the time when the fluoroscopic image was generated, from the fluoroscopic image generation apparatus; a positional deviation calculating section that calculates positional deviation between a position of a diaphragm of the subject in the generated DRR image and a position of the diaphragm of the subject in the acquired fluoroscopic image, for the same rotational angle; and a radiation permission determining section that permits radiation of the radiation beam from the radiation beam source toward the subject, when the positional deviation is less than or equal to a prescribed value; and the positional deviation calculating section: generates a plurality of shift images by shifting the fluoroscopic image by a prescribed increment along a craniocaudal direction of the subject, within a prescribed range in the craniocaudal direction; calculates a normalized correlation coefficient between the DRR image and each of the plurality of generated shift images; and determines a shift amount of the shift image corresponding to the largest normalized correlation coefficient among the plurality of calculated normalized correlation coefficients, relative to the DRR image in the craniocaudal direction, to be the positional deviation.

A third aspect of the present invention is a radiation control method for controlling radiation of a radiation beam from a radiation beam source toward a subject, based on a treatment plan for the subject and a fluoroscopic image of the subject, wherein: the treatment plan includes a CT image at a specific respiratory phase of the subject and isocenter coordinates for specifying an irradiation position of the radiation beam at the specific respiratory phase of the subject; the radiation beam source is mounted on a gantry, and is capable of irradiating the subject with the radiation beam when the subject is positioned on a rotational axis of the gantry; the fluoroscopic image is generated by a fluoroscopic image generation apparatus arranged approximately coaxially with the rotational axis; the radiation control method comprises: a first step of acquiring the treatment plan; a second step of generating a DRR image of the subject for each prescribed angle of the gantry, based on the CT image and the isocenter coordinates included in the acquired treatment plan; a third step of acquiring the fluoroscopic image and the rotational angle of the gantry at the time when the fluoroscopic image was generated; a fourth step of calculating positional deviation between a position of a diaphragm of the subject in the generated DRR image and a position of the diaphragm of the subject in the acquired fluoroscopic image, for the same rotational angle; and a fifth step of permitting radiation of the radiation beam from the radiation beam source toward the subject, when the positional deviation is less than or equal to a prescribed value; and the fourth step includes: generating a plurality of shift images by shifting the fluoroscopic image by a prescribed increment along a craniocaudal direction of the subject, within a prescribed range in the craniocaudal direction; calculating a normalized correlation coefficient between the DRR image and each of the plurality of generated shift images; and determining a shift amount of the shift image corresponding to the largest normalized correlation coefficient among the plurality of calculated normalized correlation coefficients, relative to the DRR image in the craniocaudal direction, to be the positional deviation.

A fourth aspect of the present invention is a storage medium storing the program that causes a computer to execute the radiation control method of the third aspect.

With the present invention, the shift amount corresponding to the largest normalized correlation coefficient is determined to be the positional deviation, and therefore the positional deviation can be calculated with higher accuracy. Due to this, it is possible to accurately determine whether to permit the radiation of the radiation beam from the radiation beam source toward the subject, based on the determined positional deviation. As a result, it is possible to more accurately control the radiation of the radiation beam from the radiation beam source toward the subject.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
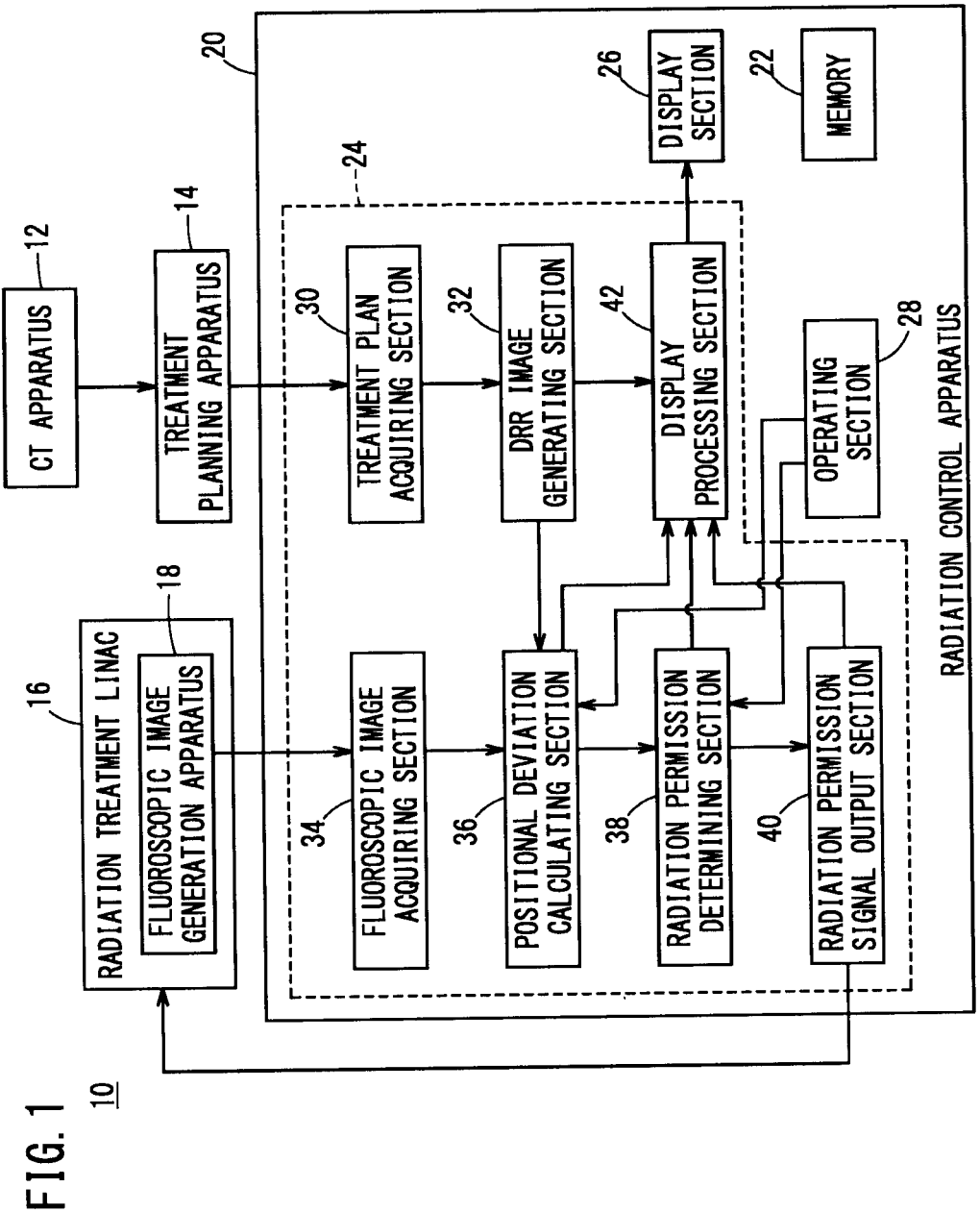
FIG. 1 is a schematic configurational view of a radiation treatment system according to the present embodiment.

FIG. 1 is a schematic configurational view of a radiation treatment system 10 according to the present embodiment. The radiation treatment system 10 is provided in a medical facility (not shown in the drawings). The radiation treatment system 10 performs radiation treatment on a subject (not shown in the drawings). The subject is the body or the like of a patient. That is, the radiation treatment system 10 performs radiation treatment on a treatment target location inside the subject. More specifically, the radiation treatment system 10 performs radiation treatment on a tumor by irradiating the tumor, which is a treatment target location, with a radiation treatment beam (radiation beam).

The radiation treatment system 10 includes a CT apparatus 12, a treatment planning apparatus 14, a radiation treatment linac 16 (radiation treatment device), a fluoroscopic image generation apparatus 18, and a radiation control apparatus 20. The radiation control apparatus 20, the treatment planning apparatus 14, and the radiation treatment linac 16 (fluoroscopic image generation apparatus 18) are formed to be capable of bidirectional communication.

The CT apparatus 12 generates a CT image at a specific respiratory phase within a patient, for each patient serving as a subject. The CT apparatus 12 transmits the generated CT image to the treatment planning apparatus 14. The CT apparatus 12 should be a CT apparatus 12 for treatment planning that includes a respiration sensor, for example. Due to this, the CT apparatus 12 can project the CT image of the subject at the specific respiratory phase (e.g., when the subject holds their breath).

The treatment planning apparatus 14 creates a treatment plan for radiation treatment of the subject. Specifically, the treatment planning apparatus 14 uses the CT images transmitted from the CT apparatus 12 to identify the position of a tumor during a specific respiratory movement of the subject. The treatment planning apparatus 14 creates a treatment plan including the CT image and isocenter coordinates for specifying an irradiation target location of the treatment radiation beam. The irradiation target location is a tumor serving as the treatment target location.

The specific respiratory phase may be deep exhalation or deep inhalation of the subject. The deep inhalation includes the maximum inhalation of the subject. The deep exhalation includes the maximum exhalation of the subject. During the deep exhalation and deep inhalation, the treatment target location is temporarily stopped, and therefore the subject preferably holds their breath in the state of deep exhalation or deep inhalation. If the treatment target location is irradiated with the treatment radiation beam during such a respiratory phase, it is possible to accurately perform the radiation treatment. It should be noted that, with the radiation treatment system 10 according to the present embodiment, it is also possible to repeatedly maintain the breath-holding state of the subject in a prescribed phase between deep exhalation and deep inhalation.

The treatment planning apparatus 14 transmits the created treatment plan (CT image, isocenter coordinates) to the radiation control apparatus 20, as data of the DICOM-RT standard.

The radiation treatment linac 16 includes a gantry (not shown in the drawings) and a radiation treatment beam source (not shown in the drawings). In the following description, the radiation treatment beam source is referred to as a radiation beam source. The radiation beam source is mounted on the gantry.

During the radiation treatment, the subject is arranged on a rotational axis (not shown in the drawings) of the gantry. Specifically, a bed (not shown in the drawings) is arranged along the rotational axis in the radiation treatment linac 16. The subject lies on the bed. The bed can move along the rotational axis. During the radiation treatment, the bed moves to a position where the subject faces the radiation beam source. In a state where the radiation beam source is facing the subject and the gantry is rotating around the rotational axis, the radiation beam source radiates the treatment radiation beam toward the subject from any rotational angle of the gantry.

The fluoroscopic image generation apparatus 18 is attached to the radiation treatment linac 16, in a manner to be arranged approximately coaxially with the rotational axis. The fluoroscopic image generation apparatus 18 is a radiation imaging apparatus. The fluoroscopic image generation apparatus 18 includes a radiation source such as an X-ray tube (not shown in the drawings) and a radiation detector such as a flat panel X-ray detector (not shown in the drawings). The radiation source (the X-ray tube) and the radiation detector (the flat panel) are attached to the linac gantry at ±90° offset, respectively, from the treatment beam source, and rotate coaxially with the radiation treatment beam source around the rotational axis. The subject on the bed is positioned between the X-ray tube and the flat panel to acquire fluoroscopic images.

The kilovoltage radiation source (X-ray tube) irradiates the subject in a state where the bed is moving along the rotational axis and the radiation source and radiation detector are facing each other with the subject therebetween. The radiation detector generates a fluoroscopic image of the subject by converting the radiation that has passed through the subject into an electric signal (image signal).

The fluoroscopic image generation apparatus 18 performs streaming output of the fluoroscopic image, the rotational angle of the gantry at the time when the fluoroscopic image was generated, and a deflection correction amount. The deflection correction amount is a correction amount for correcting displacement of the fluoroscopic image caused by deflection or sagging in the radiation detector due to gravity. The streamed fluoroscopic image, rotational angle, and deflection correction amount are transmitted to the radiation control apparatus 20 via a gigabit Ethernet line. The streaming output is output approximately in real time, with a delay time of approximately 100 ms to 200 ms. Furthermore, the deflection correction amount may be stored in advance in a memory 22 (storage medium) of the radiation control apparatus 20. In this case, a deflection correction amount is stored in the memory 22 for each prescribed angle of the gantry. In this case, the prescribed incremental angle should be any angle within a range from 0.5° to 5°, for example. The prescribed incremental angle is more preferably 1°.

In a case where the fluoroscopic image generation apparatus 18 is mounted on the gantry, the radiation source and radiation detector are arranged at rotational positions at ±90° relative to the radiation treatment beam source in the gantry. When the gantry rotates, the radiation source and radiation detector rotate around the rotational axis together with the radiation beam source. In this case, the deflection correction amount becomes a correction amount that depends on the rotational angle of the gantry. Furthermore, the deflection correction amount becomes a correction amount resulting from the sagging mostly caused by the weight of the radiation detector. In the following description, the deflection correction amount is treated as a correction amount that depends on the rotational angle of the gantry.

The radiation control apparatus 20 is a computer. The radiation control apparatus 20 includes the memory 22, a control processing section 24, a display section 26, and an operating section 28. The control processing section 24 realizes the functions of a treatment plan acquiring section 30, a DRR image generating section 32, a fluoroscopic image acquiring section 34, a positional deviation calculating section 36, a radiation permission determining section 38, a radiation permission signal output section 40, and a display processing section 42 by reading and executing a program stored in the memory 22. That is, the radiation control apparatus 20 functions as a control apparatus for controlling the radiation of the treatment radiation beam from the radiation beam source toward the subject.

The treatment plan acquiring section 30 acquires (receives) the treatment plan (CT image, isocenter coordinates) transmitted from the treatment planning apparatus 14. The fluoroscopic image acquiring section 34 acquires (receives) the fluoroscopic image, gantry rotational angle, and deflection correction amount streamed from the fluoroscopic image generation apparatus 18.

The DRR image generating section 32 generates a DRR image of the subject for each prescribed angle around the rotational axis, from the CT image and isocenter coordinates included in the treatment plan. Specifically, the DRR image generating section 32 generates a DRR image for each arbitrary incremental angle (prescribed incremental angle) in a range from 0.5° to 5°. The prescribed angle is more preferably 1°, leading to 360 angles in total ranging from 0° to 359° with a step of 1°. The DRR image is a fluoroscopic image of the inside of the subject simulated from the CT image for the treatment plan. That is, the DRR image generating section 32 generates the DRR image using the CT image obtained when the subject holds their breath at the prescribed respiratory phase to be used in the radiation treatment.

The reception of the fluoroscopic image, rotational angle, and deflection correction amount by the fluoroscopic image acquiring section 34 is performed repeatedly approximately in real time during the radiation treatment of the subject. Therefore, the treatment plan acquiring section 30 must receive the CT image and isocenter information before the radiation treatment of the subject is started. Furthermore, the DRR image generating section 32 must generate the DRR image before the radiation treatment of the subject is started.

It should be noted that the position of the tumor in the subject can move by approximately several centimeters in the craniocaudal direction of the subject, due to the respiratory movement of the subject. Furthermore, the fluoroscopic image is a two-dimensional image provided as an intensity distribution of the radiation after passing through the subject. Therefore, there are many cases where it is difficult to confirm a relatively small tumor in the fluoroscopic image. Furthermore, the diaphragm is displaced by the respiratory movement of the subject. However, the diaphragm is relatively large compared to a tumor. Furthermore, the diaphragm exists underneath the lungs, which have low density, and above the liver, which has high density. Therefore, the diaphragm is easily recognized in the fluoroscopic image.

Therefore, the positional deviation calculating section 36 uses the fluoroscopic image and DRR image at the same rotational angle of the gantry to calculate the positional deviation between the position of the diaphragm of the subject in the DRR image and the position of the diaphragm of the subject in the fluoroscopic image. That is, when the position of the diaphragm of the subject in the DRR is a reference, the positional deviation calculating section 36 calculates the positional deviation of the diaphragm of the subject in the fluoroscopic image relative to the reference diaphragm position. In other words, the positional deviation calculating section 36 calculates the positional deviation of the diaphragm by comparing the positions of the diaphragm in the fluoroscopic image and DRR image at the same gantry rotational angle. Due to this, it is possible to determine whether a tumor is actually present at a predetermined irradiation position of the treatment radiation beam in the treatment plan.

Furthermore, deflection occurs in the radiation detector due to gravity depending on the rotational angle of the gantry. Therefore, there are cases where the fluoroscopic image is affected by this deflection. To counter this, the positional deviation calculating section 36 uses the pre-measured deflection correction amount to correct the position of the diaphragm of the subject in the fluoroscopic image. Therefore, the positional deviation calculating section 36 calculates the positional deviation in order to correlate the corrected fluoroscopic image and the DRR image.

The positional deviation calculating section 36 generates a plurality of shift images by shifting the fluoroscopic image by 1 mm intervals (increments) in a range of ±6.5 mm, for example, in the craniocaudal direction along the anatomical shape of the subject, at the same rotational angle.

The prescribed range for shifting the fluoroscopic image should be a range of ±2 mm to ±10 mm along the craniocaudal direction on the anatomical shape of the subject, relative to the original fluoroscopic image. Specifically, the prescribed range should be an integer or half-integer value from ±2 mm to ±10 mm. The increment by which the fluoroscopic image is shifted should be in a range from 0.5 mm to 1.5 mm. Specifically, the increment should be an integer or half-integer value (0.5 mm, 1.0 mm, 1.5 mm) in the range from 0.5 mm to 1.5 mm. In the prescribed range, the positive direction is the direction toward the head of the subject relative to the original fluoroscopic image. Furthermore, the negative direction is the direction toward the feet of the subject relative to the original fluoroscopic image.

The positional deviation calculating section 36 calculates the normalized correlation coefficient with respect to the DRR image, for each of the plurality of shift images. The positional deviation calculating section 36 determines the shift amount of the shift image corresponding to the maximum normalized correlation coefficient, relative to the original fluoroscopic image in the craniocaudal direction, to be the positional deviation described above. For example, if there is no positional deviation of the diaphragm between the fluoroscopic image and the DRR image, the normalized correlation coefficient becomes the maximum at a shift amount of 0 mm. The details of the method for calculating the normalized correlation coefficient are described further below.

When the positional deviation is less than or equal to a prescribed value, the radiation permission determining section 38 permits radiation of the treatment radiation beam from the radiation beam source toward the subject. If the positional deviation is less than or equal to the prescribed value, the position of the tumor in the DRR image and the position of the tumor in the fluoroscopic image approximately match. In such a state, if the treatment radiation beam is radiated from the radiation treatment beam source toward the subject, it is possible to accurately perform the radiation treatment of the tumor.

When the radiation permission determining section 38 has determined that radiation of the treatment radiation beam is permitted, the radiation permission signal output section 40 transmits to the radiation treatment linac 16 a radiation permission signal that permits radiation of the treatment radiation beam. The radiation permission signal output section 40 should communicate by software using a USB terminal, for example. Due to this, the radiation permission signal is reliably transmitted to the radiation treatment linac 16. The radiation treatment linac 16 can radiate the treatment radiation beam from the radiation beam source toward the subject only in a case where the radiation permission signal has been received.

The display processing section 42 performs a display process for displaying various images such as the DRR image and the fluoroscopic image in the display section 26. The display processing section 42 performs a display process for displaying an image for setting the prescribed range, increment, and prescribed value described above in the display section 26. The display section 26 is a display. The display section 26 displays an image created by the display processing section 42 in a screen.

The operating section 28 is various operating sections such as a touch panel, a keyboard, and a mouse. An operator of the radiation treatment system 10 can check the display content of the display section 26, and set or change at least one value among the prescribed range, the increment, and the prescribed value by operating the operating section 28.

The following will describe an operation (radiation control method) of the radiation treatment system 10 including the radiation control apparatus 20, while referencing FIGS. 2 to 21. In the description of this operation, FIG. 1 will also be referenced as necessary. Here, a case will be described in which radiation therapy is performed on a tumor of a subject in a medical facility that has adopted the radiation treatment system 10.

Prior to performing the radiation treatment, the CT apparatus 12 (see FIG. 1) generates a CT image of the subject at the prescribed respiratory phase (e.g., deep exhalation or deep inhalation of the subject). Instead, the fluoroscopic image generation apparatus 18 may generate the CT image of the subject.

Next, the treatment planning apparatus 14 acquires the CT image of the subject from the CT apparatus 12 or the fluoroscopic image generation apparatus 18. The treatment planning apparatus 14 creates the treatment plan for the subject, using the acquired CT image. Specifically, the treatment planning apparatus 14 determines the position of the tumor in the CT image to be the irradiation target location of the treatment radiation beam. Next, the treatment planning apparatus 14 specifies the isocenter coordinates that are the coordinates of the position of the tumor (irradiation target location). In this way, the treatment plan including the CT image and isocenter coordinates is created.

Next, in order to perform the radiation treatment, the subject is positioned on the rotational axis of the gantry. Specifically, the subject is laid along the rotational axis on a bed arranged parallel to the rotational axis of the gantry. Next, the bed is moved along the rotational axis as well as other two orthogonal directions to a position where the radiation beam source, radiation source, and radiation detector face the subject. In more detail, the center of the tumor in the subject moves to the linac isocenter position.

After movement of the bed is finished, the subject is irradiated with radiation from the radiation source of the fluoroscopic image generation apparatus 18. The radiation detector converts the projected X-ray intensities into an image signal. In this way, the radiation that has passed through the subject is converted into an image signal corresponding to the projected intensities. As a result, the fluoroscopic image is generated.

The fluoroscopic image generation apparatus 18 streams the fluoroscopic image of the subject, the rotational angle of the gantry, and the deflection correction amount. The deflection correction amount corresponding to the rotational angle does not change over the long term. Therefore, the deflection correction amount can be stored in advance in the memory 22 of the radiation control apparatus 20.

Figure 2:
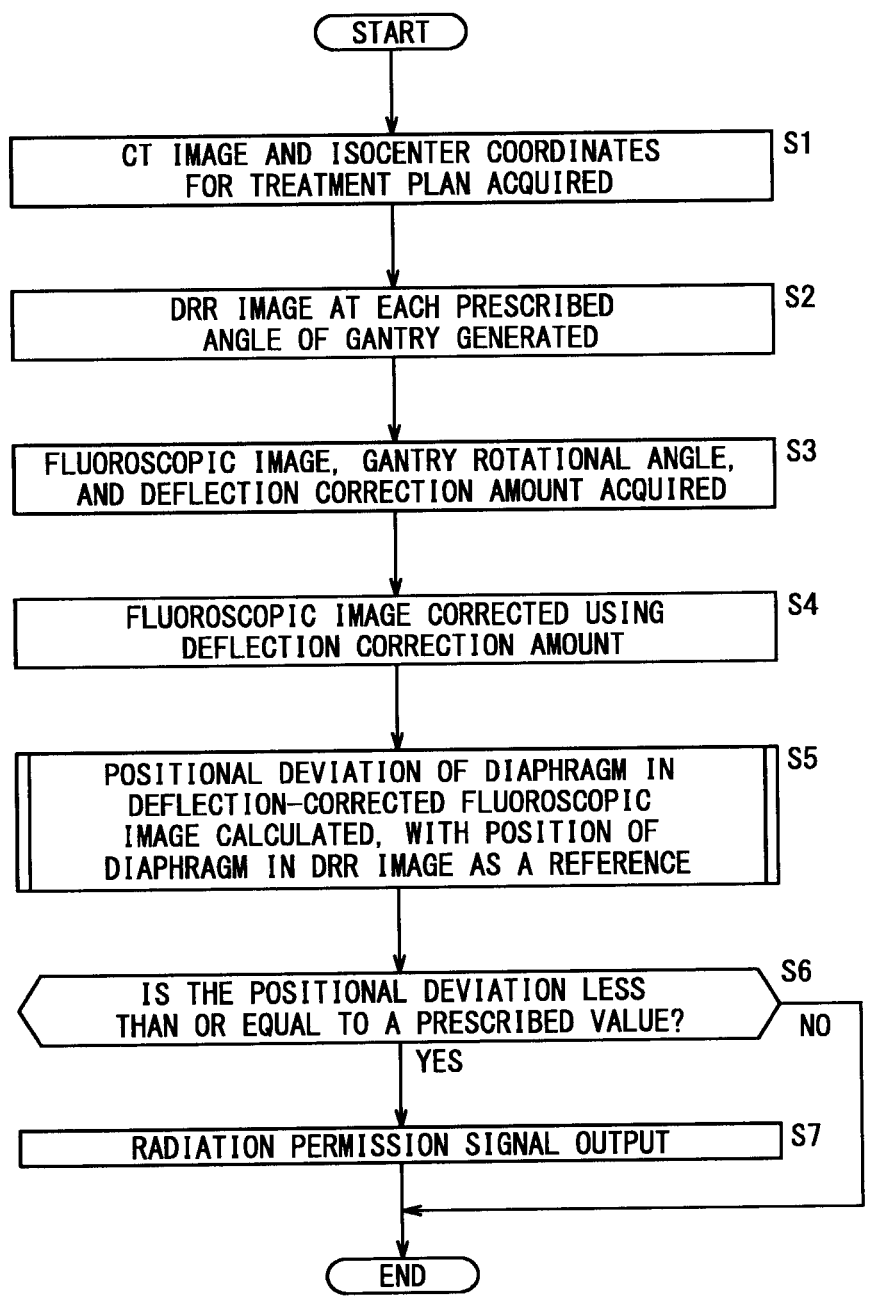
FIG. 2 is a flow chart of an operation (radiation control method) of a radiation control apparatus.

Then, at step S1 (first step) of FIG. 2, the treatment plan acquiring section 30 (see FIG. 1) receives the treatment plan for the subject transmitted from the treatment planning apparatus 14. In the manner described above, the treatment plan includes the CT image and isocenter coordinates of the subject at the prescribed respiratory phase.

At the following step S2 (second step), the DRR image generating section 32 generates a DRR image for each prescribed angle of the gantry, from the CT image and isocenter coordinates included in the treatment plan. The DRR image generating section 32 outputs the generated plurality of DRR images to the positional deviation calculating section 36. The processes of steps S1 and S2 are preferably performed before the radiation of the treatment radiation beam toward the subject.

Figure 4:
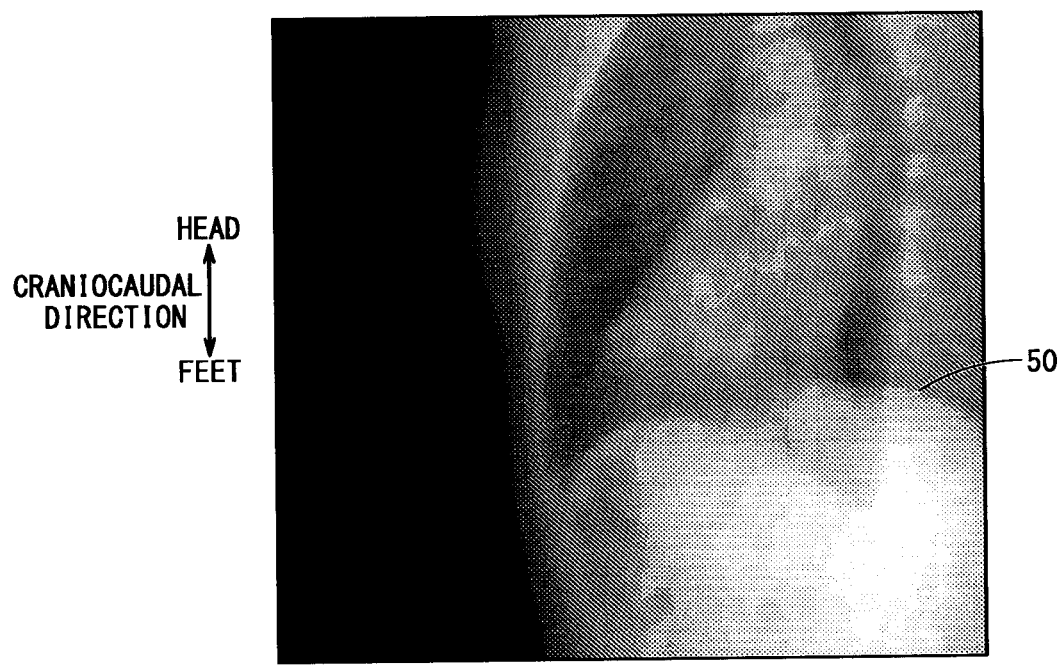
FIG. 4 shows an example of a DRR image.
Figure 5:
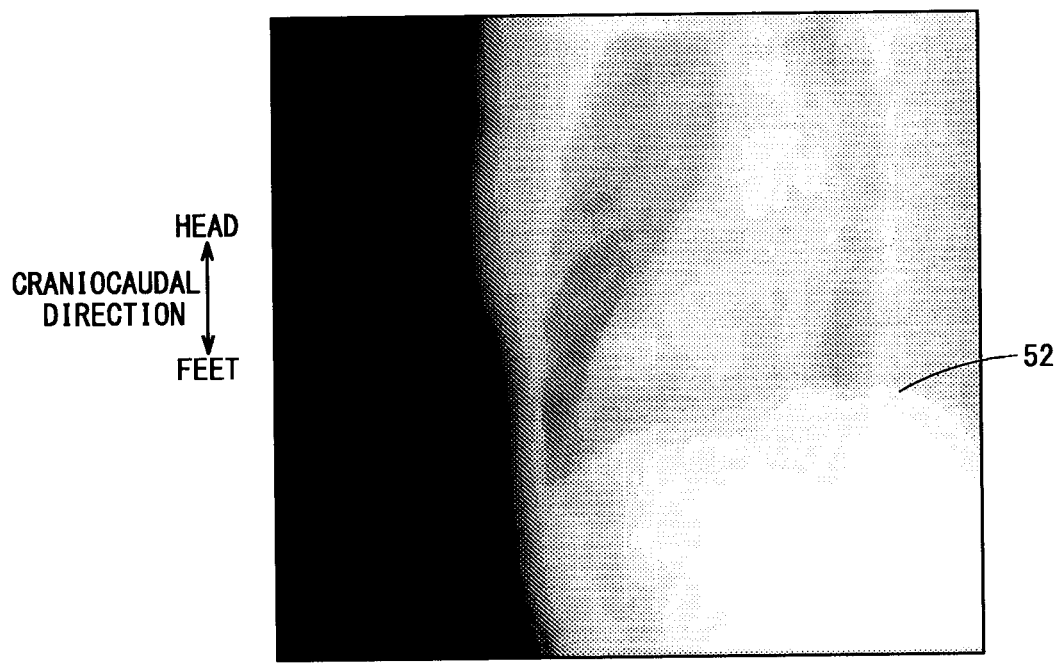
FIG. 5 shows an example of a fluoroscopic image.

The DRR image generating section 32 calculates a DRR image for every 1°, for example. FIG. 4 shows an example of a DRR image. FIG. 4 shows a DRR image of a chest portion of the subject. In FIG. 4, the up-down direction is the craniocaudal direction of the subject. That is, the upward direction in FIG. 4 is the direction toward the head of the subject. The downward direction in FIG. 4 is the direction toward the feet of the subject. A diaphragm 50 is also captured in the DRR image of FIG. 4. FIG. 4 is a DRR image at the same rotational angle as the fluoroscopic image of FIG. 5 described further below. Furthermore, the images of FIG. 4 and FIG. 5 are each an image to be used in the radiation treatment of lung or liver cancer for example.

The streamed rotational angle is indicated by a number with decimals. Therefore, for the DRR image that is actually used, the rotation angle is rounded to the nearest whole number.

When described in greater detail, at step S2 of FIG. 2, the DRR image generating section 32 (see FIG. 1) simulates the DRR image from the CT image, using mechanical parameters of the fluoroscopic image generation apparatus 18. The mechanical parameters include a distance from a focal point of the radiation source to the isocenter, a distance from this focal point to the radiation detector, and the size and pixel size of the radiation detector. The DRR image generating section 32 simulates the DRR image corresponding to the fluoroscopic image by performing ray tracing on each radiation ray (X-ray) spreading from the focal point of the radiation source (X-ray tube), and adding together the CT values on the straight lines.

Next, at step S3 (third step), the fluoroscopic image acquiring section 34 receives the fluoroscopic image, gantry rotational angle, and deflection correction amount streamed from the fluoroscopic image generation apparatus 18. The fluoroscopic image acquiring section 34 outputs the received fluoroscopic image, gantry rotational angle, and deflection correction amount to the positional deviation calculating section 36.

FIG. 5 shows an example of a fluoroscopic image received by the fluoroscopic image acquiring section 34 (see FIG. 1). FIG. 5 shows a fluoroscopic image of the chest portion of the subject. In FIG. 5 as well, the up-down direction is the craniocaudal direction. The diaphragm 52 is also captured in the fluoroscopic image in FIG. 5.

At step S4 of FIG. 2, the positional deviation calculating section 36 (see FIG. 1) corrects the coordinates of the fluoroscopic image using the deflection correction amount. Specifically, the deflection correction amount has a craniocaudal component and a left-right component in the fluoroscopic image. The positional deviation calculating section 36 moves the streamed fluoroscopic image in a direction parallel to the craniocaudal direction, by an amount corresponding to the craniocaudal direction component. Furthermore, the positional deviation calculating section 36 moves the streamed fluoroscopic image in a direction parallel to the left-right direction, by an amount corresponding to the left-right direction component. In the manner described above, the deflection correction amount depends on the rotational angle of the gantry. Therefore, the positional deviation calculating section 36 references the rotational angle for each of the plurality of fluoroscopic images and corrects the fluoroscopic images according to the rotational angles.

At the following step S5 (fourth step), the positional deviation calculating section 36 uses the fluoroscopic image and DRR image at the same rotational angle of the gantry to calculate the positional deviation between the diaphragm 50 of the subject in the DRR image and the diaphragm 52 of the subject in the fluoroscopic image. More specifically, the positional deviation calculating section 36 uses the position of the diaphragm 50 in the DRR image of FIG. 4 as a reference, for example, and calculates the positional deviation of the diaphragm 52 in the fluoroscopic image of FIG. 5 relative to the position of the diaphragm 50 serving as the reference.

That is, in a case where the DRR image and the fluoroscopic image are compared at the same rotational angle, they should be approximately the same image. However, the actual position of the diaphragm 52 (position during respiratory motion) in the fluoroscopic image may be shifted by approximately several centimeters in the craniocaudal direction relative to the position of the diaphragm 50 (position in the specified respiratory phase) in the DRR image serving as the reference, due to respiration of the subject. Therefore, the positional deviation calculating section 36 calculates the positional deviation between the diaphragms 50 and 52 of the DRR image and fluoroscopic image at the same rotational angle, as described above. Details of the method of calculating the positional deviation will be described further below.

At the following step S6, the radiation permission determining section 38 determines whether the positional deviation calculated by the positional deviation calculating section 36 is less than or equal to the prescribed value. If the positional deviation is less than or equal to the prescribed value (step S6: YES), the radiation permission determining section 38 determines that the tumor can be accurately irradiated with the treatment radiation beam. Next, the radiation permission determining section 38 permits the radiation of the treatment radiation beam, and outputs a determination result indicating permission for radiation to the radiation permission signal output section 40.

At the following step S7 (fifth step), the radiation permission signal output section 40 transmits the radiation permission signal to the radiation treatment linac 16, based on the determination result of the radiation permission from the radiation permission determining section 38. Due to this, the radiation treatment linac 16 radiates the treatment radiation beam from the radiation beam source toward the subject, based on the received radiation permission signal.

At step S6, if the positional deviation exceeds the prescribed value (step S6: NO), the radiation permission determining section 38 determines that the tumor cannot be accurately irradiated with the treatment radiation beam. Next, the radiation permission determining section 38 outputs the determination result that the radiation is not permitted, to the radiation permission signal output section 40. The radiation permission signal output section 40 does not output the radiation permission signal, based on the input determination result. Accordingly, the radiation treatment linac 16 stops the radiation of the treatment radiation beam from the radiation beam source.

The outline of the operation of the present embodiment is as described above. The following describes a specific example of the process of step S5 of FIG. 2, while referencing FIGS. 3 and 6 to 21. In this specific example, the positional deviation is calculated using the technique of (1) to (5) below.

(1) The positional deviation calculating section 36 calculates the normalized correlation coefficient for the fluoroscopic image (see FIG. 5) and DRR image (see FIG. 4) at the same rotational angle.

(2) The positional deviation calculating section 36 selects a single partial image region including the diaphragm 50 in the DRR image, for the fluoroscopic image and DRR image at the same rotational angle. The positional deviation calculating section 36 selects a partial image region, in the fluoroscopic image, that has the same coordinates as the partial image region of the DRR image. The positional deviation calculating section 36 calculates the normalized correlation coefficient between the partial image region of the DRR image and the partial image region of the fluoroscopic image.

(3) The positional deviation calculating section 36 exponentiates at least the pixel values of a plurality of pixels forming the fluoroscopic image, among the fluoroscopic image and DRR image at the same rotational angle. In this way, the positional deviation calculating section 36 generates a new image in which the contrast of the fluoroscopic image is improved. The positional deviation calculating section 36 uses the generated new image or the like to calculate the normalized correlation coefficient.

(4) The positional deviation calculating section 36 calculates an average value of the plurality of pixels forming the image, for each of the fluoroscopic image and DRR image at the same rotational angle. The positional deviation calculating section 36 generates a new image by subtracting the calculated average value from the pixel values of the plurality of pixels forming the image. The positional deviation calculating section 36 calculates the normalized correlation coefficient using the generated new images and the like.

(5) The positional deviation calculating section 36 generates a plurality of shift images by shifting the fluoroscopic image by the prescribed increment along the craniocaudal direction, within a prescribed range in the craniocaudal direction. The positional deviation calculating section 36 calculates the normalized correlation coefficient with respect to the DRR image, for each of the plurality of generated shift images. The positional deviation calculating section 36 determines the shift amount relative to the DRR image in the craniocaudal direction to be the positional deviation for the shift image giving the largest normalized correlation coefficient.

Figure 3:
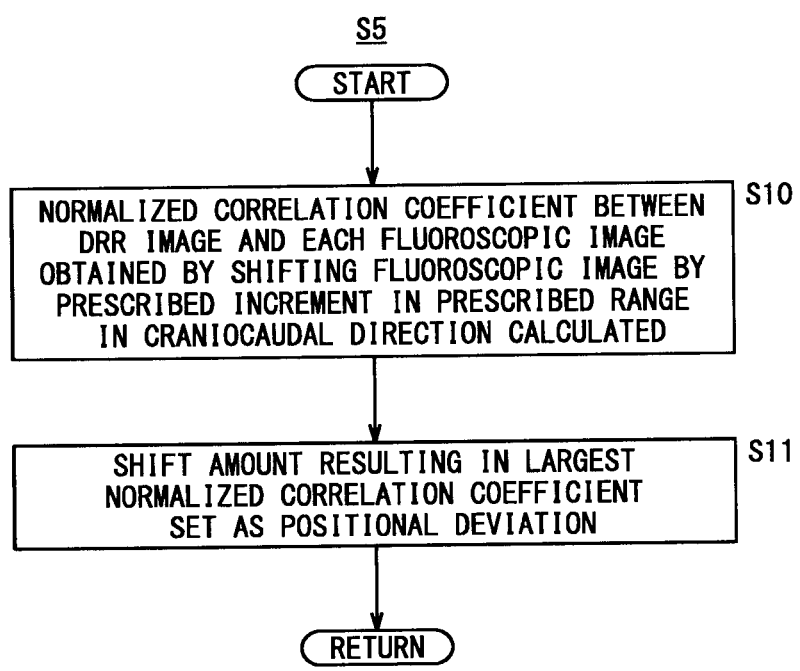
FIG. 3 is a flow chart of the specific processing of step S5 of FIG. 2.

FIG. 3 is a flow chart showing a specific process of the step S5 of FIG. 2. In the flow chart of FIG. 3, the positional deviation calculating section 36 combines the techniques of (1) to (5) above to calculate the positional deviation. The following describes the specific processing operations of FIG. 3.

At step S10 of FIG. 3, the positional deviation calculating section 36 (see FIG. 1) calculates the normalized correlation coefficient for the fluoroscopic image and DRR image at the same rotational angle. It should be noted that in step S5, the objective is the calculation of the positional deviation between the diaphragms 50 and 52. The positional deviation of the entire subject is expected to be spatially different. Therefore, the positional deviation calculating section 36 must calculate the positional deviation while focusing on a small region including the diaphragms 50 and 52.

Figure 6:
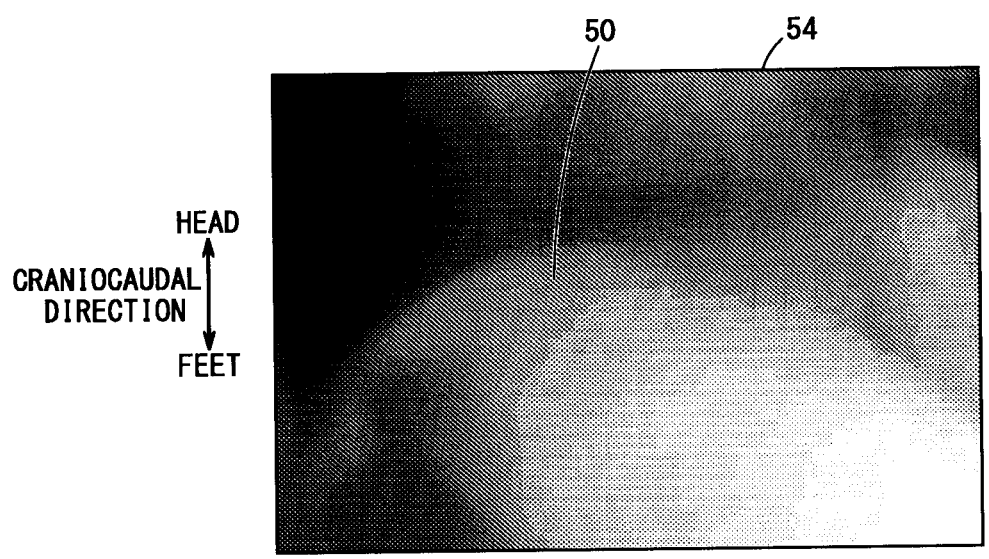
FIG. 6 shows an example of a partial image region of the DRR image.
Figure 7:
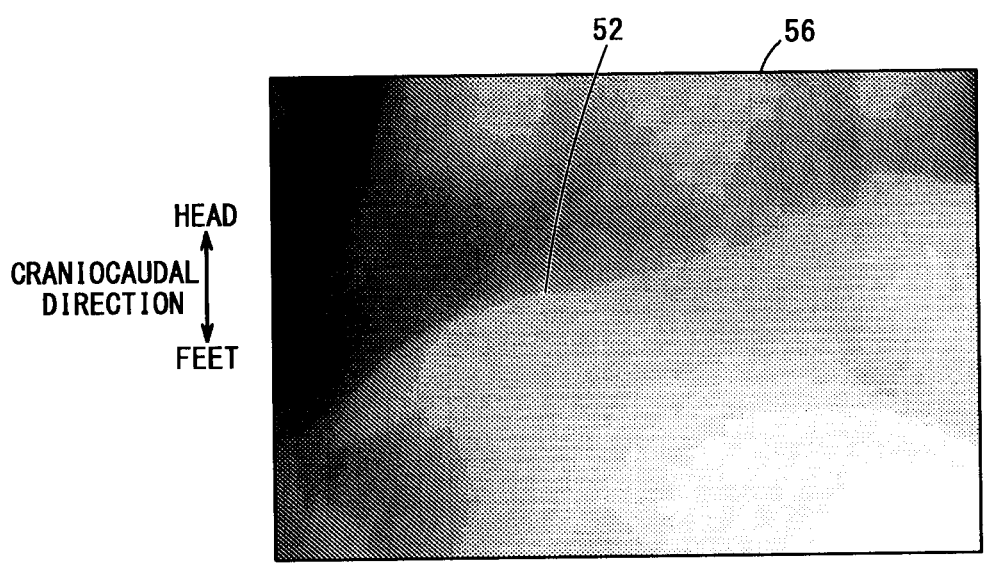
FIG. 7 shows an example of a partial image region of the fluoroscopic image.

Therefore, the positional deviation calculating section 36 desirably calculates the positional deviation using the images of the partial image regions 54 and 56 of FIGS. 6 and 7, instead of the DRR image of FIG. 4 and the fluoroscopic image of FIG. 5. FIG. 6 shows the partial image region 54 selected from the DRR image of FIG. 4. The partial image region 54 (first partial image region) of FIG. 6 is a single partial image region that is selected from the DRR image and includes the diaphragm 50. The partial image region 56 (second partial image region) of FIG. 7 shows a partial image region selected from the fluoroscopic image of FIG. 5. The partial image region 56 of FIG. 7 is a single partial image region that is selected from the fluoroscopic image and includes the diaphragm 52. Each of the partial image regions 54 and 56 of FIGS. 6 and 7 must be cut out at the same coordinates. If there is no positional deviation between the fluoroscopic image and the DRR image, the positional deviation calculating section 36 can calculate the positional deviation to be 0.

Figure 8:
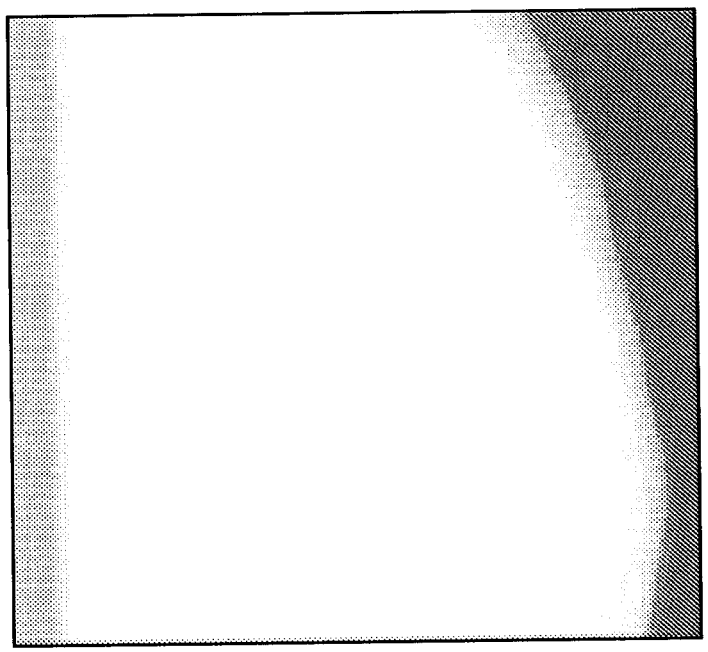
FIG. 8 shows an example of the fluoroscopic image.

There are cases where the fluoroscopic image received by the fluoroscopic image acquiring section 34 (see FIG. 1) has poor contrast due to scattered rays being mixed therein, as shown in FIG. 8. This fluoroscopic image is an image to be used for the radiation treatment of lung or liver cancer for example. In this fluoroscopic image, the radiation volume of the X-rays for fluoroscopy in the visceral region is greater than in the fluoroscopic image of FIG. 5. Accordingly, in the fluoroscopic image of FIG. 8, scattered rays have a significantly greater effect than in the fluoroscopic image of FIG. 5.

Figure 9:
FIG. 9 shows an example of an image obtained by raising the pixel value of each pixel forming the fluoroscopic image of FIG. 8 to the power of 60.

FIG. 9 is a new fluoroscopic image in which the contrast of the fluoroscopic image of FIG. 8 has been improved. The fluoroscopic image of FIG. 9 is an image obtained by raising the pixel values of the plurality of pixels forming the fluoroscopic image of FIG. 8 to the power of 60. That is, signal levels of pixels having relatively small pixel values are made even smaller by exponentiating the pixel values of the plurality of pixels. Furthermore, the signal levels of pixels having relatively large pixel values are made even larger by exponentiating the pixel values of the plurality of pixels. Accordingly, the fluoroscopic image of FIG. 9 has improved contrast compared to the fluoroscopic image of FIG. 8.

By exponentiating the pixel values of the plurality of pixels forming the DRR image received by the treatment plan acquiring section 30 (see FIG. 1) as well, it is possible to improve the contrast. However, scattered rays are not included in the DRR image in the calculation. Therefore, an exponent (exponent number) of approximately 2 to 4 is sufficient for the DRR image.

Figure 10:
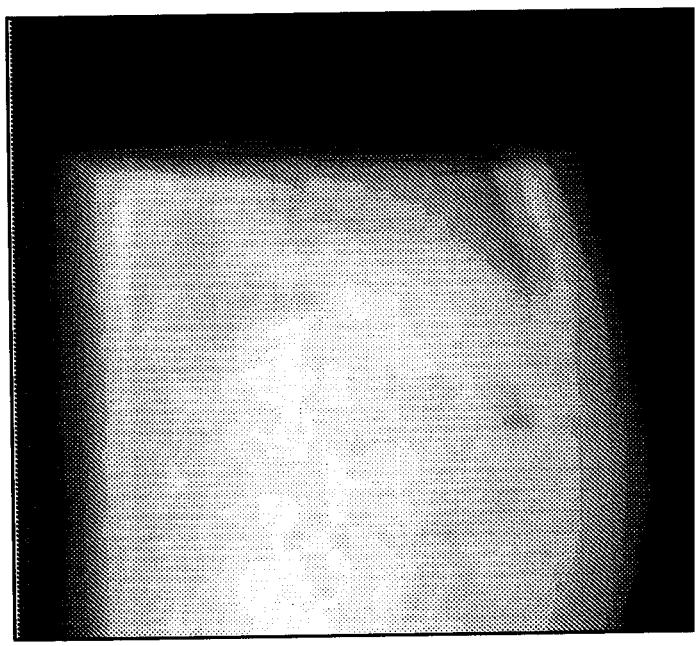
FIG. 10 shows an example of the DRR image.
Figure 11:
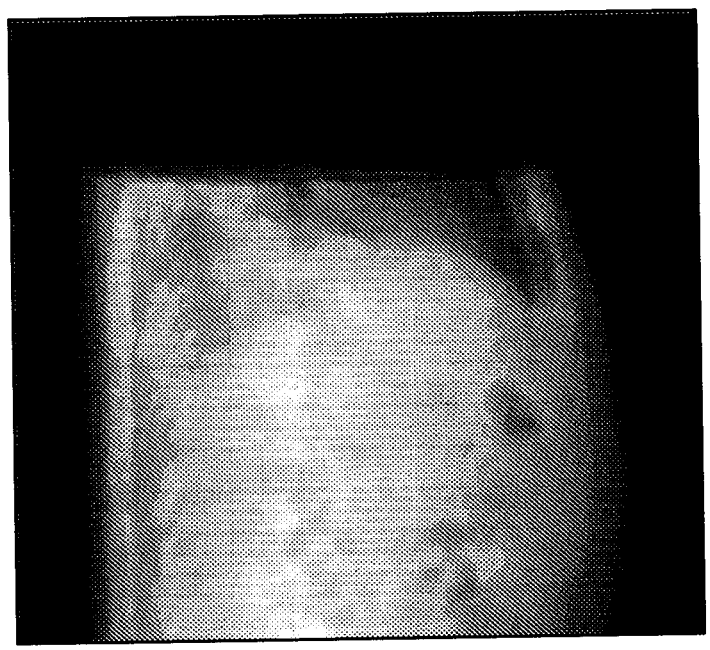
FIG. 11 shows an example of an image obtained by squaring the pixel value of each pixel forming the DRR image of FIG. 10.

FIG. 10 shows an example of a DRR image. FIG. 11 shows a new DRR image obtained by, for example, squaring the pixel values of the plurality of pixels forming the DRR image of FIG. 10. The DRR image of FIG. 11 has improved contrast compared to the DRR image of FIG. 10.

As described above, the positional deviation calculating section 36 (see FIG. 1) does not calculate the positional deviation of the diaphragms 50 and 52 (see FIGS. 4 and 5) between the entire fluoroscopic image and the entire DRR image. The positional deviation calculating section 36 extracts (selects) the single partial image regions 54 and 56 (see FIGS. 6 and 7) including the diaphragms 50 and 52 respectively from the fluoroscopic image and DRR image at the same rotational angle. The positional deviation calculating section 36 calculates the positional deviation of the diaphragms 50 and 52, for the extracted partial image region 56 of the fluoroscopic image and partial image region 54 of the DRR image.

Due to this, the positional deviation between the diaphragms 50 and 52 can be accurately calculated. Furthermore, the number of pixels when calculating the normalized correlation coefficient can be significantly reduced. As a result, the calculation of the normalized correlation coefficient can be performed more quickly.

Here, the pixel values of the plurality of pixels forming the partial image region 56 of the fluoroscopic image are A(i,j). The average value of each pixel value A(i,j) is Am. The pixel values of the plurality of pixels forming the partial image region 54 of the DRR image are B(i,j). The average value of each pixel value B(i,j) is Bm. In this case, the normalized correlation coefficients R1 and R2 of the partial image region 56 of the fluoroscopic image and the partial image region 54 of the DRR image are respectively expressed as shown by Equations (1) and (2) below.

$$R1 = \frac{\sum[\{A(i,j)-Am\} \times \{B(i,j)-Bm\}]}{\sqrt{\sum\{A(i,j)-Am\}^2} \times \sqrt{\sum\{B(i,j)-Bm\}^2}} \quad \text{Equation (1)}$$

$$R2 = \frac{\sum[A(i,j) \times B(i,j)]}{\sqrt{\sum A(i,j)^2} \times \sqrt{\sum B(i,j)^2}} \quad \text{Equation (2)}$$

Equation (1) shows an equation of the normalized correlation coefficient using a value obtained by subtracting the average values Am and Bm from each pixel value A(i,j) and B(i,j). Equation (2) shows an equation of the normalized correlation coefficient in which the average values Am and Bm are not subtracted from each pixel value A(i,j) and B(i,j). Here, i indicates the coordinate value of each partial image region 54 and partial image region 56 in a lateral direction (left-right direction), and j indicates the coordinate value of each partial image region 54 and partial image region 56 in a vertical direction (craniocaudal direction). Furthermore, Σ is a mathematical symbol indicating the summation of the pixel values or the like of each pixel at the coordinates (i,j).

As a result of comparing the two normalized correlation coefficients R1 and R2 via a numerical simulation, it was understood that the normalized correlation coefficient R1 has a greater rate of change relative to the positional deviation of the respiratory origin than the normalized correlation coefficient R2. That is, the normalized correlation coefficient R1 has higher detection sensitivity for the positional deviation than the normalized correlation coefficient R2, and is therefore more useful.

Each pixel value A(i,j) may be a pixel value of the plurality of pixels forming the fluoroscopic image received by the fluoroscopic image acquiring section 34, or a pixel value obtained by exponentiating each of these pixel values. Furthermore, each pixel value B(i,j) may be a pixel value of the plurality of pixels forming the DRR image received by the treatment plan acquiring section 30, or a pixel value obtained by exponentiating each of these pixel values.

The method for improving the contrast of the fluoroscopic image can also be performed by limiting the display range of the fluoroscopic image. As an example, the pixel values of the plurality of pixels forming the fluoroscopic image are offset by the scattered rays. Therefore, the positional deviation calculating section 36 may set a suitable cutoff value. Due to this, the contrast of the fluoroscopic image can be improved by displaying only the pixel values greater than or equal to the cutoff value in the screen of the display section 26.

Figure 12:
FIG. 12 shows an example of an image obtained by subtracting 52000 from the pixel value of each pixel forming the fluoroscopic image of FIG. 8, then replacing each negative pixel value with 0, and then raising the pixel value of each pixel to the power of 16.

Furthermore, the fluoroscopic image is usually displayed as a 16-bit non-negative integer type of image. In this case, the largest value among the pixel values of the fluoroscopic image is 65535. Therefore, the positional deviation calculating section 36 may subtract 52000 from each pixel value and replace each resulting pixel value that is negative with 0. FIG. 12 shows a new fluoroscopic image obtained by raising the pixel values of the plurality of pixels forming a fluoroscopic image to the power of 16 after such a replacement has been performed. By performing the above replacement and then exponentiating the pixel values, the contrast of the fluoroscopic image can be improved.

Figure 13:
FIG. 13 shows an example of an image obtained by subtracting 55000 from the pixel value of each pixel forming the fluoroscopic image of FIG. 8, then replacing each negative pixel value with 0, and then raising the pixel value of each pixel to the power of 16.

The fluoroscopic image of FIG. 12 has a much smaller exponent than the fluoroscopic image of FIG. 9 (exponent of 60). Therefore, the positional deviation calculating section 36 (see FIG. 1) can perform the calculation for generating the fluoroscopic image of FIG. 12 without overflowing in normal double precision arithmetic. Furthermore, by making the exponent significantly smaller, the calculation can be performed more quickly. FIG. 13 shows a new fluoroscopic image in a case where the value subtracted from each pixel value has been changed to 55000. Even when the integer being subtracted is changed, the contrast of the fluoroscopic image can be improved.

That is, conventionally, it has been necessary to make the exponent extremely large, such as by raising the pixel values of the plurality of pixels forming the fluoroscopic image to the power of 40, in order to increase the contrast of the fluoroscopic image. In such cases, the calculation of the fluoroscopic image could overflow, resulting in a calculation error. In contrast to this, in the present embodiment, a numerical value of 50000, for example, is subtracted from the pixel values of the plurality of pixels forming the fluoroscopic image, and resulting pixel values that are negative are replaced with 0. Due to this, even when the pixel values of the plurality of pixels forming the fluoroscopic image are raised to the power of 8, for example, it is possible to achieve a contrast equivalent to that of the conventional art. In other words, in the present embodiment, it is possible to increase the contrast of the fluoroscopic image while avoiding the risk of overflow. Due to this, the positional deviation can be calculated accurately.

The partial image region 56 is preferably cut out after the integer value of approximately 40000 to 55000 has been subtracted from the pixel values of the plurality of pixels forming the fluoroscopic image and each resulting pixel value has been raised to a power of approximately 1 to 16 as described above. Furthermore, the partial image region 54 is preferably cut out after the pixel values of the plurality of pixels forming the DRR image have been raised to a power of approximately 1 to 4.

Then, at step S10, the positional deviation calculating section 36 generates the plurality of shift images at the same rotational angle by shifting the fluoroscopic image by the prescribed increment in a prescribed range in the craniocaudal direction, along the anatomical shape of the subject. In this case, new shift images (first shift images) may be generated by performing the exponentiating calculation of the pixel values described above and replacing resulting pixel values that are negative with 0, for each of the plurality of shift images. Furthermore, the partial image region 56 is preferably cut out of each of the plurality of shift images or plurality of first shift images.

Also at step S10, the positional deviation calculating section 36 calculates the normalized correlation coefficient with respect to the DRR image or the partial image region 54, for each of the plurality of shift images, plurality of first shift images, or plurality of partial image regions 56, using Equation (1) or (2) described above.

At step S11 of FIG. 3, the positional deviation calculating section 36 (see FIG. 1) determines the positional deviation, using the calculation result of the normalized correlation coefficient from step S10. In step S11, the positional deviation calculating section 36 determines the shift amount of the shift image giving the largest normalized correlation coefficient, among the plurality of normalized correlation coefficients, to be the positional deviation.

Figure 14:
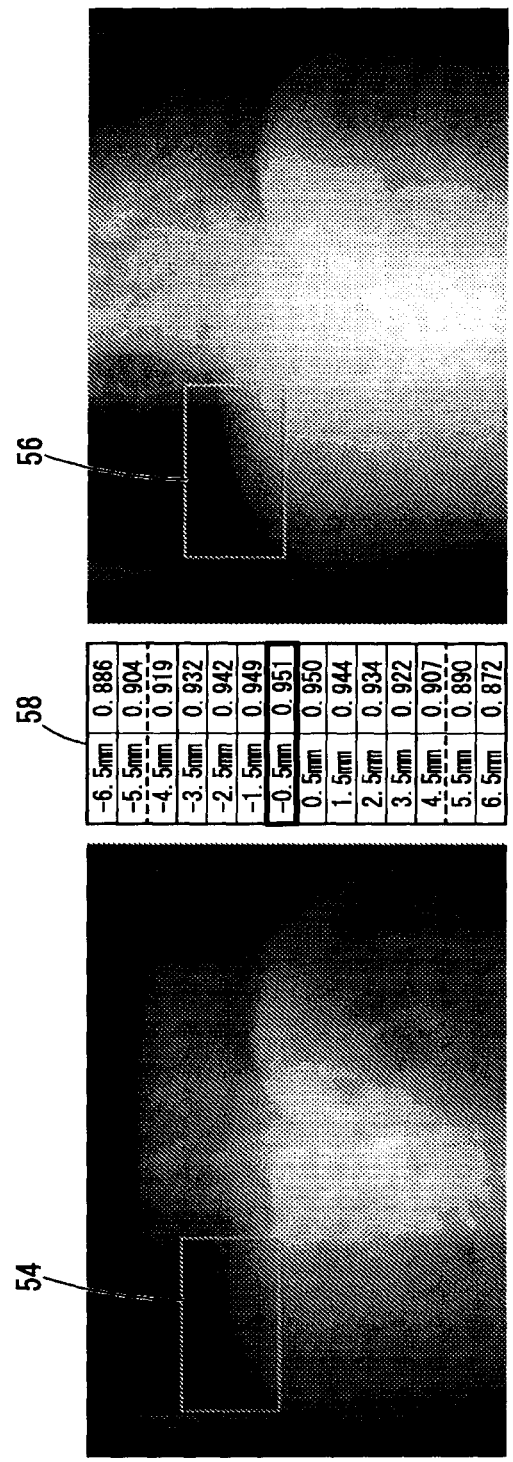
FIG. 14 shows an example of a screen display.

FIG. 14 shows a screen display of the display section 26 (see FIG. 1) at steps S10 and S11. In the screen of the display section 26, the image displayed on the left side is the DRR image. The image displayed on the right side is the fluoroscopic image at the same rotational angle as the DRR image. The partial image regions 54 and 56 are displayed respectively in the fluoroscopic image and DRR image.

The normalized correlation coefficient is calculated for each of the partial image region 54 and 56 as described above, for example. Since the deflection correction is performed on the fluoroscopic image, the coordinates of the partial image region 56 of the fluoroscopic image are corrected by the deflection amount. In the example of FIG. 14, the deflection correction amount is approximately several millimeters.

An image 58 of the prescribed range and the calculation result of the normalized correlation coefficient is displayed in the center of the screen of the display section 26. A prescribed range from −6.5 mm to +6.5 mm and the calculation result of the normalized correlation coefficient when the fluoroscopic image has been shifted in the craniocaudal direction by an increment of 1 mm are displayed in the screen 58 in the up-down direction.

In the example of FIG. 14, the largest normalized correlation coefficient is 0.951. Furthermore, the shift amount corresponding to the largest normalized correlation coefficient is −0.5 mm. This means that when the fluoroscopic image is shifted by −0.5 mm in the direction toward the feet, the best matching between the fluoroscopic image and DRR image is realized. That is, the positional deviation can be concluded as being −0.5 mm.

In this case, the display section 26 displays the largest normalized correlation coefficient and the shift amount corresponding to the largest normalized correlation coefficient, in an emphasized manner in the screen 58. For example, the largest normalized correlation coefficient and the shift amount corresponding to the largest normalized correlation coefficient are displayed highlighted with red characters. In FIG. 14, the largest normalized correlation coefficient and the shift amount corresponding to the largest normalized correlation coefficient are framed by a thick line. By having such an emphasized display, the operator of the radiation treatment system 10 can observe the positional shift with the naked eye until the radiation of the treatment radiation beam is completed.

Furthermore, the display section 26 may display a prescribed value in an emphasized manner. In FIG. 14, the prescribed value is set to be ±5 mm, for example. In this case, the positions of the prescribed value are displayed with a red line, for example. In FIG. 14, the positions of the prescribed value are displayed in an emphasized manner by dashed lines. Accordingly, when the positional deviation is within a range from −5 mm to +5 mm, the radiation of the treatment radiation beam is permitted.

Figure 15:
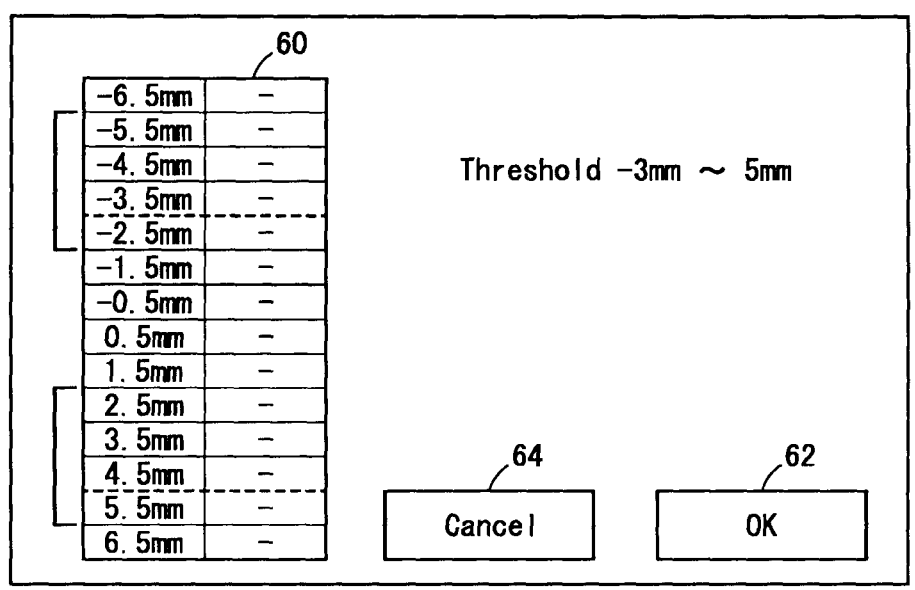
FIG. 15 shows an example of the screen display.

FIG. 15 is an image diagram showing an example of a GUI (graphic user interface) of application software to which the irradiation control device 20 is applied. This image diagram is an image diagram of a touch panel display.

In FIG. 15, a plurality of widgets are displayed in the screen. Among these, a widget 60 for setting the prescribed value is displayed on the left side of the screen. This widget 60 corresponds to the screen 58 in the center of FIG. 14. This widget 60 is a widget for setting the positions of the dashed lines indicating the prescribed value. An OK button 62 and a cancel button 64 are displayed in the lower portion of the screen.

By pressing the OK button 62 after operating the widget 60 to set the prescribed value, the operator of the radiation treatment system 10 can set or change the prescribed value. If the prescribed value has been set or changed, the range of the set or changed prescribed value is displayed on the right side of the screen. Furthermore, after selecting the prescribed value, the operator can cancel the selected prescribed value by pressing the cancel button 64.

If the prescribed value is set to ±3 mm, for example, radiation of the treatment radiation beam is permitted when the positional deviation is 3 mm or less. Furthermore, in view of the craniocaudal movement of the diaphragms 50 and 52 (see FIGS. 4 and 5), it is also possible to set the prescribed value to be different values in the direction of the head and the direction of the feet. FIG. 15 shows a case in which the prescribed value is set to be a range from −3 mm to +5 mm. In FIG. 15, a case in which the fluoroscopic image is shifted by an increment of 1 mm within a prescribed range of −6.5 mm to +6.5 mm is displayed on the left side of the screen. The positions of +5 mm and −3 mm, which are the upper limit and lower limit of the prescribed value, are shown by dashed lines on the left side of the screen.

If the positional deviation calculating section 36 has determined that the positional deviation is 3 mm, the normalized correlation coefficient is the same and at a maximum at both the shift amount of 2.5 mm and the shift amount of 3.5 mm. That is, it is possible to easily perform the determination process for permitting the radiation of the treatment radiation beam by setting the shift amount to a half-integer (integer +0.5).

Furthermore, the image dimensions for both the DRR image and fluoroscopic image are determined as a projection image projected onto an isocenter surface. Therefore, the positional deviation of the respiratory origin is discussed as the positional deviation on the isocenter surface.

Each of the partial image regions 54 and 56 (see FIGS. 6 and 7) described above had fixed coordinates that do not depend on the rotational angle of the gantry. In a normal treatment plan, the center of mass position of the tumor matches the center position of the image. Therefore, the diaphragms 50 and 52 are preferably included in the partial image regions 54 and 56 while the partial image regions 54 and 56 are made to approach the center position of the image. However, there are cases where the partial image regions 54 and 56 overlap with an image region of the heart and the contrast of the diaphragms 50 and 52 significantly decreases, at particular rotational angles of the gantry. Therefore, it is desirable that the partial image regions 54 and 56 be optimally arranged according to the rotational angle.

Figure 16:
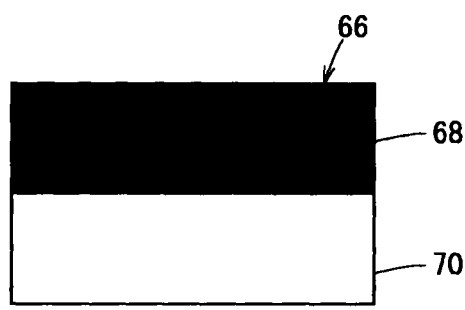
FIG. 16 shows an example of a reference image.

FIG. 16 shows a reference image 66. The reference image 66 is set to be the same size as the partial image region 54 of the DRR image. The positional deviation calculating section 36 calculates the normalized correlation coefficient (first normalized correlation coefficient) between the reference image 66 and the DRR image, and sets the partial image region 54 at a position where the normalized correlation coefficient is largest.

The reference image 66 of FIG. 16 is a rectangular image region. The reference image 66 sets the pixel values in one portion along the craniocaudal direction to be less than the pixel values of another portion. Specifically, in the reference image 66, the pixel values in an upper portion 68 on the head direction side are set to be 0. Furthermore, in the reference image 66, the pixel values in a lower portion 70 on the feet direction side are set to be 1. In other words, the pixel values on the head direction side of the diaphragm 50 are relatively small. Furthermore, the pixel values on the feet direction side of the diaphragm 50 are relatively large. Accordingly, the pixel values of the reference image 66 are set to differ between the top and bottom, as described above.

Figure 17:
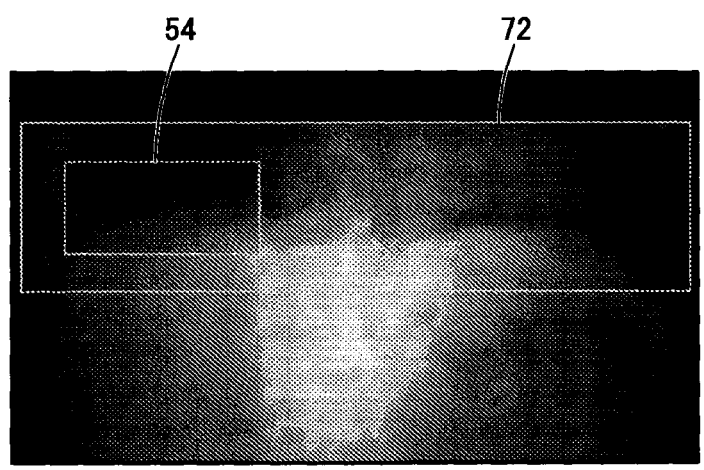
FIG. 17 is a descriptive diagram of a search for an optimal position of a partial image region in a search image region of the DRR image.

The positional deviation calculating section 36 sets the reference image 66 as a template and sets the image region that most closely resembles the reference image 66 in the DRR image as the partial image region 54. Specifically, as shown in FIG. 17, the positional deviation calculating section 36 sets a search image region 72 for searching for the partial image region 54 in the DRR image. In the search image region 72, the positional deviation calculating section 36 calculates the normalized correlation coefficient between the image region for searching and the reference image 66 while moving this image region in the craniocaudal direction and left-right direction. The positional deviation calculating section 36 selects, as the partial image region 54, the image region having the largest normalized correlation coefficient with respect to the reference image 66, among the plurality of image regions in the search image region 72. In other words, the position of the image region giving the largest normalized correlation coefficient becomes the optimal arrangement position of the partial image region 54.

Figure 18:
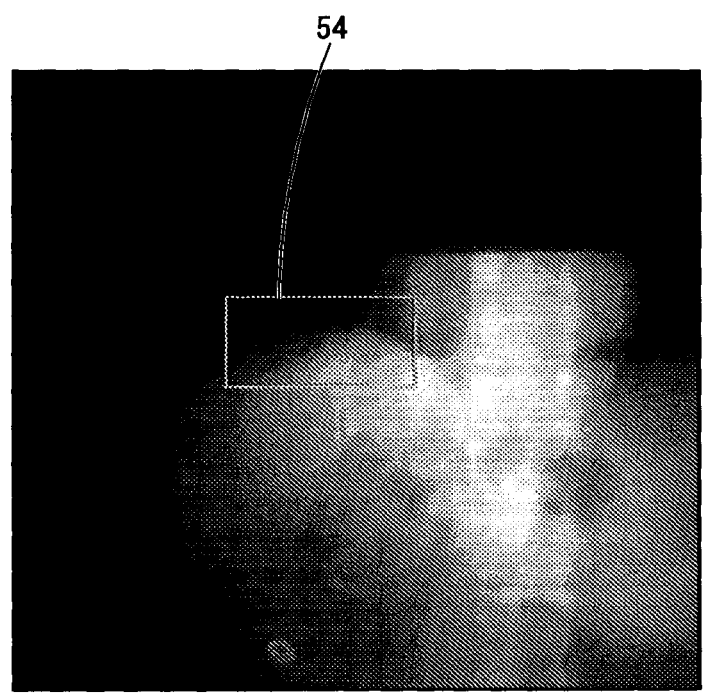
FIG. 18 is a descriptive diagram showing the optimal position of the partial image region.
Figure 19:
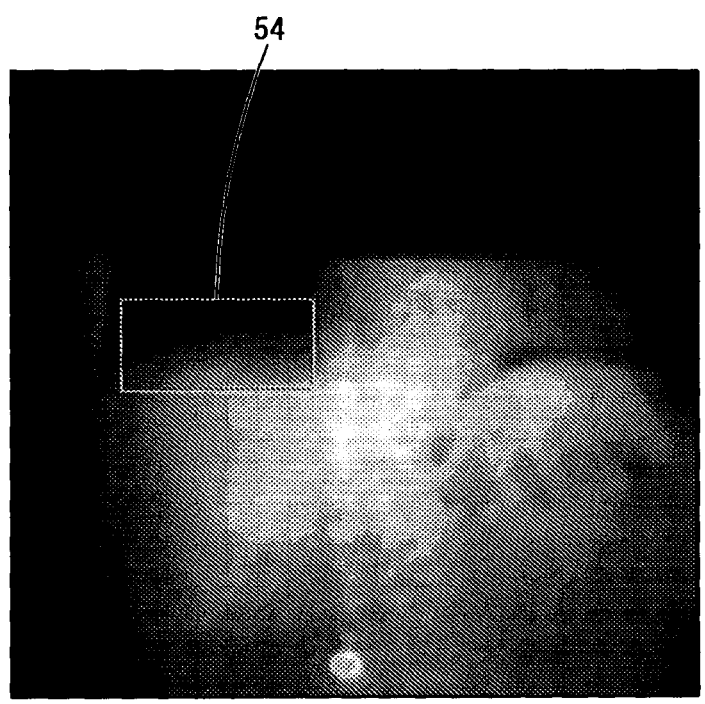
FIG. 19 is a descriptive diagram showing the optimal position of the partial image region at different gantry angles.

FIG. 18 shows the partial image region 54 optimized for a DRR image at an arbitrary rotational angle. FIG. 19 shows the partial image region 54 optimized for the DRR image at another rotational angle. As shown in FIGS. 18 and 19, the optimal position of the partial image region 54 differs according to the rotational angle of the gantry.

Figure 20:
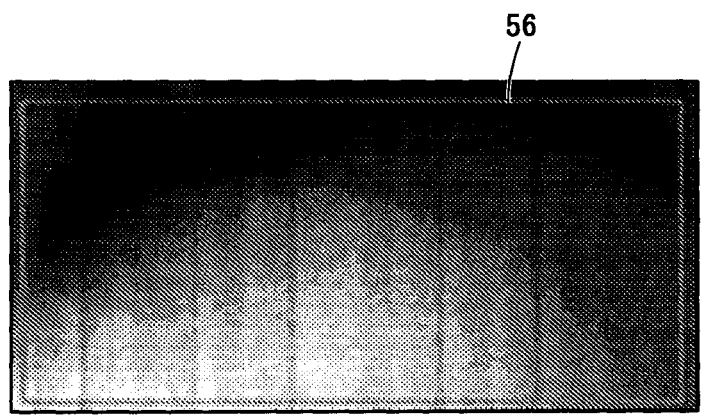
FIG. 20 is a descriptive diagram showing a partial image region in the fluoroscopic image including band-shaped noise.

As shown in FIG. 20, there are cases where band-shaped noise is mixed into the fluoroscopic image generated during radiation of the treatment radiation beam. If this noise is large, the accuracy of the calculation of the normalized correlation coefficient between the DRR image and fluoroscopic image can decrease.

Figure 21:
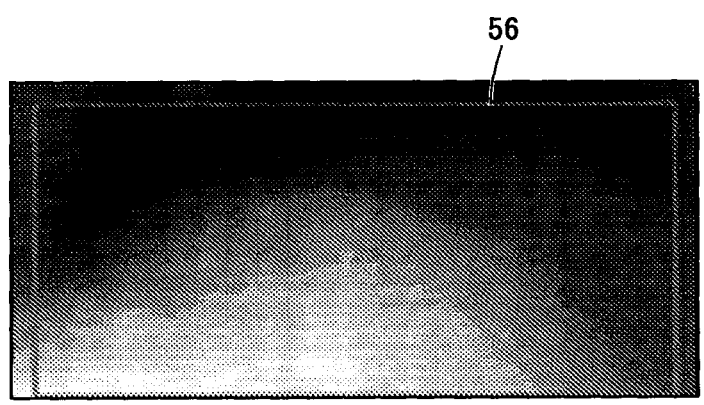
FIG. 21 is a descriptive diagram showing a state in which the band-shaped noise has been removed from the fluoroscopic image of FIG. 20 using a median filter.

Therefore, the positional deviation calculating section 36 (see FIG. 1) applies one-dimensional median filter processing in the left-right direction (lateral direction) to the fluoroscopic image of FIG. 20. FIG. 21 shows a fluoroscopic image after the one-dimensional median filter processing. The fluoroscopic image of FIG. 21 is understood to have reduced band-shaped noise, compared to the fluoroscopic image of FIG. 20.

The median filter processing removes the large fluctuation components (noise) by selecting medial values of pixel columns (a list in which pixel values are lined up) having a prescribed length. This is a commonly used filter processing method in the field of signal processing. Accordingly, by applying the one-dimensional median filter processing, it is possible to suppress band-shaped noise included in the fluoroscopic image, which is useful.

The positional deviation calculating section 36 performs the calculation of the normalized correlation coefficient using the fluoroscopic image that has undergone the one-dimensional median filter processing. Alternatively, the deviation calculating section 36 may apply the one-dimensional median filter processing to the shift image, the first shift image, or the partial image region 56.

The following is a record of the invention that can be understood from the embodiments described above.

A first aspect of the present invention is a radiation control apparatus (20) that controls radiation of a radiation beam from a radiation beam source toward a subject, based on a treatment plan for the subject and a fluoroscopic image of the subject, wherein: the treatment plan includes a CT image at a specific respiratory phase of the subject and isocenter coordinates for specifying an irradiation position of the radiation beam at the specific respiratory phase of the subject; the radiation beam source is mounted on a gantry, and is capable of irradiating the subject with the radiation beam when the subject is positioned on a rotational axis of the gantry; the fluoroscopic image is generated by a fluoroscopic image generation apparatus (18) arranged approximately coaxially with the rotational axis; the radiation control apparatus comprises: a treatment plan acquiring section (30) that acquires the treatment plan; a DRR image generating section (32) that generates a DRR image of the subject for each prescribed angle of the gantry, based on the CT image and the isocenter coordinates included in the acquired treatment plan; a fluoroscopic image acquiring section (34) that acquires the fluoroscopic image and the rotational angle of the gantry at the time when the fluoroscopic image was generated; a positional deviation calculating section (36) that calculates positional deviation between a position of a diaphragm (50) of the subject in the generated DRR image and a position of the diaphragm (52) of the subject in the acquired fluoroscopic image, for the same rotational angle; and a radiation permission determining section (38) that permits radiation of the radiation beam from the radiation beam source toward the subject, when the positional deviation is less than or equal to a prescribed value; and the positional deviation calculating section: generates a plurality of shift images by shifting the fluoroscopic image by a prescribed increment along a craniocaudal direction of the subject, within a prescribed range in the craniocaudal direction; calculates a normalized correlation coefficient between the DRR image and each of the plurality of generated shift images; and determines a shift amount of the shift image corresponding to the largest normalized correlation coefficient among the plurality of calculated normalized correlation coefficients, relative to the DRR image in the craniocaudal direction, to be the positional deviation.

According to the present invention, the shift amount corresponding to the largest normalized correlation coefficient is determined to be the positional deviation, and therefore the positional deviation can be calculated with higher accuracy. Due to this, it is possible to accurately determine whether to permit the radiation of the radiation beam from the radiation beam source toward the subject, based on the determined positional deviation. As a result, it is possible to more accurately control the radiation of the radiation beam from the radiation treatment beam source toward the subject.

The effect of the present invention will be described in greater detail.

In the fluoroscopic image, the area ratio of the liver to the lung area above the liver varies according to respiration. When the normalized correlation coefficient is calculated such that the image correlation between the fluoroscopic image and the DRR image is largest in a state where this area ratio is approximately 1:1, it is possible to calculate the positional deviation corresponding to the largest normalized correlation coefficient with high accuracy, as understood from the results of a numerical simulation. That is, when the fluoroscopic image has been shifted in the craniocaudal direction, the largest normalized correlation coefficient is obtained at an area ratio between the liver and the lung region of approximately 1:1. As a result, the calculation accuracy of the positional deviation is improved.

In contrast to this, in the DRR image, the area ratio between the liver and the lung region is preset to be approximately 1:1 in the image region for calculating the image correlation. If the DRR image is shifted in the craniocaudal direction and the positional deviation corresponding to the largest normalized correlation coefficient is calculated, the largest normalized correlation coefficient is obtained in a state where the area ratio is not 1:1. Due to this, the calculation accuracy of the positional deviation is reduced.

Furthermore, in the present invention, the plurality of shift images are generated by shifting the fluoroscopic image by the prescribed increment in the prescribed range, and the normalized correlation coefficient between the DRR image and each of the plurality of shift images is calculated. Due to this, it is possible to directly obtain the shift amount corresponding to the largest normalized correlation coefficient. Furthermore, since the obtained shift amount is determined to be the positional deviation, it is possible to accurately calculate the positional deviation. Yet further, by directly comparing the positional deviation to the prescribed value, it is possible to accurately perform the process for determining whether to permit radiation of the radiation beam.

In the first aspect of the present invention, the positional deviation calculating section: selects a single first partial image region (54) that includes the diaphragm, from within the DRR image; selects a second partial image region (56) having the same coordinate position as the first partial image region, from within the fluoroscopic image; generates the plurality of shift images by shifting the selected second partial image region by the increment within the prescribed range; and calculates the normalized correlation coefficient between the first partial image region and each of the plurality of generated shift images.

Due to this, it is possible to accurately calculate the positional deviation of the diaphragm. Furthermore, the pixel values used when calculating the normalized correlation coefficient are significantly reduced, and therefore it is possible to calculate the normalized correlation coefficient quickly.

In the first aspect of the present invention, the positional deviation calculating section sets a search image region (72) within the DRR image, searches for an image region that includes the diaphragm within the set search image region, and selects the image region found by the search as the first partial image region.

Due to this, the first partial image region including the diaphragm can be extracted in a short time.

In the first aspect of the present invention, the positional deviation calculating section calculates a first normalized correlation coefficient between a prescribed reference image (66) and each of a plurality of image regions within the search image region, and selects the image region having the largest first normalized correlation coefficient as the first partial image region.

Due to this, the first partial image region can be extracted efficiently and in a short time.

In the first aspect of the present invention, the reference image is a rectangular image region, in which pixel values (68) of one portion in the craniocaudal direction are lower than pixel values of another portion (70).

If the region used to calculate the image correlation is fixed, there are cases where the liver and the heart positioned above the liver overlap in the fluoroscopic image at particular rotational angles of the gantry, thereby losing contrast at the upper edge of the liver. Therefore, by setting the position at which the image correlation (first normalized correlation coefficient) with respect to the reference image is largest as the first partial image region, it is possible to set the partial image region according to the rotational angle. As a result, it is possible to prevent contrast at the upper edge of the liver from being lost in the fluoroscopic image.

In the first aspect of the present invention, the positional deviation calculating section: generates the first shift image by, for each of the plurality of shift images, subtracting a certain value from the plurality of pixel values forming the shift image, then replacing pixel values that are negative with 0 if pixels with negative pixel values are present among the plurality of pixels, and then exponentiating each of the plurality of pixel values of the pixels; calculates a first average value of the pixel values of the plurality of pixels forming the first shift image; generates a first DRR image by exponentiating each of the pixel values of the plurality of pixels forming the DRR image; calculates a second average value of the pixel values of the plurality of pixels forming the first DRR image; and calculates the normalized correlation coefficient for each of the plurality of first shift images, using a deviation between the first average value and each of the pixel values of the plurality of pixels forming the first shift image and a deviation between the second average value and each of the plurality of pixel values of the pixels forming the first DRR image.

Due to this, the normalized correlation coefficient can be calculated without causing an overflow. Furthermore, the normalized correlation coefficient can be calculated quickly. Yet further, the contrast of the fluoroscopic image can be improved.

In the first aspect of the present invention, the positional deviation calculating section applies median filter processing to the fluoroscopic image, the shift image, or the first shift image.

When generating the fluoroscopic image in the radiation treatment, if the radiation field of the radiation treatment beam is large, excessive scattering occurring in the subject mixes into the fluoroscopic image as linear noise. As a result, there is a possibility of the calculation result of the normalized correlation coefficient between the fluoroscopic image and DRR image becoming inaccurate. Therefore, by applying the median filter processing to the fluoroscopic image, shift image, or first shift image prior to the calculation of the normalized correlation coefficient, the noise can be reduced and the calculation accuracy of the normalized correlation coefficient can be improved.

In the first aspect of the present invention, the positional deviation calculating section: sets the certain value to be 0; selects any number from 1 to 70 as an exponent for exponentiating each of the plurality of pixel values of the plurality of pixels forming the shift image, for each of the plurality of shift images; and selects any number from 1 to 4 as an exponent for exponentiating each of the plurality of pixel values of the plurality of pixels forming the DRR image.

Due to this, it is possible to improve the contrast of the fluoroscopic image.

In the first aspect of the present invention, the positional deviation calculating section: selects any number from 40000 to 55000 as the certain value; selects any number from 1 to 30 as the exponent for exponentiating each of the plurality of pixel values of the plurality of pixels forming the shift image, for each of the plurality of shift images; and selects any number from 1 to 4 as the exponent for exponentiating each of the plurality of pixel values of the plurality of pixels forming the DRR image.

In this case, it is possible to calculate the normalized correlation coefficient quickly while avoiding overflow of the calculation of the normalized correlation coefficient, and also to improve the contrast of the fluoroscopic image In the first aspect of the present invention, the prescribed range is a range of ±2 mm to ±10 mm in the craniocaudal direction along an anatomical shape of the subject, for the fluoroscopic image; and the increment is within a range from 0.5 mm to 1.5 mm.

Due to this, the positional deviation can be calculated more accurately.

In the first aspect of the present invention, the prescribed range is an integer of half-integer value from ±2 mm to ±10 mm; and the increment is an integer of half-integer value within a range from 0.5 mm to 1.5 mm.

Due to this, the positional deviation can be calculated more accurately.

In the first aspect of the present invention, the treatment plan acquiring section acquires the CT image and the isocenter coordinates before the fluoroscopic image acquiring section acquires the fluoroscopic image and the rotational angle.

Due to this, the DRR image can be calculated in advance using the CT image and isocenter coordinates, and therefore it is possible to calculate the normalized correlation coefficient while performing the radiation treatment of the subject.

In the first aspect of the present invention, the fluoroscopic image acquiring section acquires the fluoroscopic image and the rotational angle from the fluoroscopic image generation apparatus via a gigabit Ethernet line.

Due to this, various types of streamed information can be received approximately in real time.

In the first aspect of the present invention, the treatment plan acquiring section acquires data of the CT image and the isocenter coordinates in a DICOM-RT standard, from a treatment planning apparatus (14) that creates the treatment plan.

Due to this, the CT image and isocenter coordinates can be received using existing equipment.

In the first aspect of the present invention, the DRR image generating section generates the DRR image for each prescribed incremental angle that is 0.5° to 5°.

Due to this, DRR images can be generated at intervals of 1°, for example, for all of the rotational angles of the gantry, and these DRR images can be used as reference images for the fluoroscopic image. As a result, in a case where volumetric modulated arc therapy (VMAT) is applied, the radiation treatment can be performed accurately even in the case of repeated breath-holding at the respiration phase when the treatment planning CT was acquired.

A second aspect of the present invention is a radiation treatment system (10) comprising: a radiation treatment apparatus (16) that includes a treatment planning apparatus that creates a treatment plan for radiation treatment of a subject, a gantry and a radiation beam source mounted on the gantry, and is capable of irradiating the subject with the radiation beam from the radiation beam source when the subject is positioned on a rotational axis of the gantry; a fluoroscopic image generation apparatus that is arranged approximately coaxially with the rotational axis and generates a fluoroscopic image of the subject; and a radiation control apparatus that controls radiation of the radiation beam from the radiation beam source toward the subject, based on the treatment plan and the fluoroscopic image, wherein: the treatment plan includes a CT image at a specific respiratory phase of the subject and isocenter coordinates for specifying an irradiation position of the radiation beam at the specific respiratory phase; the radiation control apparatus includes: a treatment plan acquiring section that acquires the treatment plan from the treatment planning apparatus; a DRR image generating section that generates a DRR image of the subject for each prescribed angle of the gantry, based on the CT image and the isocenter coordinates included in the acquired treatment plan; a fluoroscopic image acquiring section that acquires the fluoroscopic image and the rotational angle of the gantry at the time when the fluoroscopic image was generated, from the fluoroscopic image generation apparatus; a positional deviation calculating section that calculates positional deviation between a position of a diaphragm of the subject in the generated DRR image and a position of the diaphragm of the subject in the acquired fluoroscopic image, for the same rotational angle; and a radiation permission determining section that permits radiation of the radiation beam from the radiation beam source toward the subject, when the positional deviation is less than or equal to a prescribed value; and the positional deviation calculating section: generates a plurality of shift images by shifting the fluoroscopic image by a prescribed increment along a craniocaudal direction of the subject, within a prescribed range in the craniocaudal direction; calculates a normalized correlation coefficient between the DRR image and each of the plurality of generated shift images; and determines a shift amount of the shift image corresponding to the largest normalized correlation coefficient among the plurality of calculated normalized correlation coefficients, relative to the DRR image in the craniocaudal direction, to be the positional deviation.

This invention can also realize the same effects as the first aspect.

A third aspect of the present invention is a radiation control method for controlling radiation of a radiation beam from a radiation beam source toward a subject, based on a treatment plan for the subject and a fluoroscopic image of the subject, wherein: the treatment plan includes a CT image at a specific respiratory phase of the subject and isocenter coordinates for specifying an irradiation position of the radiation beam at the specific respiratory phase; the radiation beam source is mounted on a gantry, and is capable of irradiating the subject with the radiation beam when the subject is positioned on a rotational axis of the gantry; the fluoroscopic image is generated by a fluoroscopic image generation apparatus arranged approximately coaxially with the rotational axis; the radiation control method comprises: a first step of acquiring the treatment plan; a second step of generating a DRR image of the subject for each prescribed angle of the gantry, based on the CT image and the isocenter coordinates included in the acquired treatment plan; a third step of acquiring the fluoroscopic image and the rotational angle of the gantry at the time when the fluoroscopic image was generated; a fourth step of calculating positional deviation between a position of a diaphragm of the subject in the generated DRR image and a position of the diaphragm of the subject in the acquired fluoroscopic image, for the same rotational angle; and a fifth step of permitting radiation of the radiation beam from the radiation beam source toward the subject, when the positional deviation is less than or equal to a prescribed value; and the fourth step includes: generating a plurality of shift images by shifting the fluoroscopic image by a prescribed increment along a craniocaudal direction of the subject, within a prescribed range in the craniocaudal direction; calculating a normalized correlation coefficient between the DRR image and each of the plurality of generated shift images; and determining a shift amount of the shift image corresponding to the largest normalized correlation coefficient among the plurality of calculated normalized correlation coefficients, relative to the DRR image in the craniocaudal direction, to be the positional deviation.

This invention can also realize the same effects as the first aspect.

A fourth aspect of the present invention is a program that causes a computer (20) to execute the radiation control method of the third aspect.

This invention can also realize the same effects as the first aspect.

A fifth aspect of the present invention is a storage apparatus (22) storing the program of the fourth aspect.

This invention can also realize the same effects as the first aspect.

The present invention is not limited to the above-described embodiments, and it goes without saying that various modifications could be adopted therein without departing from the essence and gist of the present invention.

The invention claimed is:

1. A radiation control apparatus that controls radiation of a radiation beam from a radiation beam source toward a subject, based on a treatment plan for the subject and a fluoroscopic image of the subject, wherein:
   the treatment plan includes a computed tomography image at a specific respiratory phase of the subject and isocenter coordinates for specifying an irradiation position of the radiation beam at the specific respiratory phase of the subject;

the radiation beam source is mounted on a gantry, and is configured to irradiate the subject with the radiation beam when the subject is positioned along a rotational axis of the gantry;

the fluoroscopic image of the subject is generated by a fluoroscopic image generation apparatus arranged approximately coaxially with the rotational axis of the gantry; and the radiation control apparatus comprises one or more processors and a memory storing computer-executable instructions configured to cause the one or more processors to function as:

a treatment plan acquiring section that acquires the treatment plan;

a digitally reconstructed radiograph image generating section that generates a digitally reconstructed radiograph image of the subject for each prescribed angle of the gantry, based on the computed tomography image and the isocenter coordinates included in the acquired treatment plan;

a fluoroscopic image acquiring section that acquires the fluoroscopic image of the subject and a rotational angle of the gantry at a time when the fluoroscopic image of the subject was generated;

a positional deviation calculating section that calculates a positional deviation between a position of a diaphragm of the subject in the generated digitally reconstructed radiograph image of the subject and a position of the diaphragm of the subject in the acquired fluoroscopic image of the subject, for a same rotational angle; and a radiation permission determining section that permits radiation of the radiation beam from the radiation beam source toward the subject, in a case where the positional deviation is less than or equal to a prescribed value; and the positional deviation calculating section:

generates a plurality of shift images by shifting the fluoroscopic image of the subject by a prescribed increment along a craniocaudal direction of the subject, within a prescribed range in the craniocaudal direction;

calculates a normalized correlation coefficient between the digitally reconstructed radiograph image of the subject and each of the generated plurality of shift images; and determines a shift amount of a shift image corresponding to a largest normalized correlation coefficient among a plurality of calculated normalized correlation coefficients, relative to the digitally reconstructed radiograph image of the subject in the craniocaudal direction, to be the positional deviation.

2. The radiation control apparatus according to claim 1, wherein the positional deviation calculating section:

selects a single first partial image region that includes the diaphragm, from within the digitally reconstructed radiograph image of the subject;

selects a second partial image region having a same coordinate position as the single first partial image region, from within the fluoroscopic image of the subject;

generates the plurality of shift images by shifting the selected second partial image region by the prescribed increment within the prescribed range; and calculates the normalized correlation coefficient between the single first partial image region and each of the generated plurality of shift images.

3. The radiation control apparatus according to claim 2, wherein:

the positional deviation calculating section sets a search image region within the digitally reconstructed radiograph image of the subject, searches for an image region that includes the diaphragm within the set search image region, and selects an image region found by a search as the single first partial image region.

4. The radiation control apparatus according to claim 3, wherein:

the positional deviation calculating section calculates a first normalized correlation coefficient between a prescribed reference image and each of a plurality of image regions within the search image region, and selects an image region having a largest first normalized correlation coefficient as the single first partial image region.

5. The radiation control apparatus according to claim 4, wherein:

the prescribed reference image is a rectangular image region, in which pixel values of one portion in the craniocaudal direction are lower than pixel values of another portion.

6. The radiation control apparatus according to claim 1, wherein the positional deviation calculating section:

generates a first shift image by, for each of the plurality of shift images, subtracting a predetermined value from a plurality of pixel values of pixels forming each shift image of the plurality of shift images, then replacing pixel values that are negative with 0 if pixels with negative pixel values are present among a plurality of pixels, and then exponentiating each of the plurality of pixel values of the pixels;

calculates a first average value of the pixel values of the plurality of pixels forming the first shift image;

generates a first digitally reconstructed radiograph image by exponentiating each of pixel values of a plurality of pixels forming the digitally reconstructed radiograph image;

calculates a second average value of the pixel values of the plurality of pixels forming the first digitally reconstructed radiograph image; and calculates the normalized correlation coefficient for each of a plurality of first shift images, using a deviation between the first average value and each of the pixel values of the plurality of pixels forming the first shift image and a deviation between the second average value and each of a plurality of pixel values of pixels forming the first digitally reconstructed radiograph image.

7. The radiation control apparatus according to claim 6, wherein:

the positional deviation calculating section applies median filter processing to the fluoroscopic image of the subject, the shift image, or the first shift image.

8. The radiation control apparatus according to claim 6, wherein the positional deviation calculating section:

sets the predetermined value to be 0;

selects any number from 1 to 70 as an exponent for exponentiating each of a plurality of pixel values of a plurality of pixels forming the shift image, for each of the plurality of shift images; and selects any number from 1 to 4 as an exponent for exponentiating each of a plurality of pixel values of a plurality of pixels forming the digitally reconstructed radiograph image.

9. The radiation control apparatus according to claim 6, wherein the positional deviation calculating section:
selects any number from 40000 to 55000 as the predetermined value;
selects any number from 1 to 30 as an exponent for exponentiating each of a plurality of pixel values of a plurality of pixels forming the shift image, for each of the plurality of shift images; and
selects any number from 1 to 4 as an exponent for exponentiating each of a plurality of pixel values of a plurality of pixels forming the digitally reconstructed radiograph image.

10. The radiation control apparatus according to claim 1, wherein:
the prescribed range is a range in the craniocaudal direction of ±2 mm to ±10 mm in the craniocaudal direction along an anatomical shape of the subject, for the fluoroscopic image of the subject; and
the prescribed increment along a craniocaudal direction of the subject is within a range from 0.5 mm to 1.5 mm.

11. The radiation control apparatus according to claim 10, wherein:
the prescribed range in the craniocaudal direction is an integer or a half-integer from ±2 mm to ±10 mm; and
the prescribed increment along a craniocaudal direction of the subject is an integer or a half-integer within a range from 0.5 mm to 1.5 mm.

12. The radiation control apparatus according to claim 1, wherein:
the treatment plan acquiring section acquires the computed tomography image and the isocenter coordinates before the fluoroscopic image acquiring section acquires the fluoroscopic image of the subject and the rotational angle.

13. The radiation control apparatus according to claim 1, wherein:
the fluoroscopic image acquiring section acquires the fluoroscopic image of the subject and the rotational angle from the fluoroscopic image generation apparatus via a gigabit Ethernet line.

14. The radiation control apparatus according to claim 1, wherein:
the treatment plan acquiring section acquires data of the computed tomography image and the isocenter coordinates in a DICOM-RT standard, from a treatment planning apparatus that creates the treatment plan.

15. The radiation control apparatus according to claim 1, wherein:
the digitally reconstructed radiograph image generating section generates the digitally reconstructed radiograph image for each prescribed incremental angle that is 0.5° to 5°.

16. A radiation treatment system comprising:
a treatment planning apparatus that creates a treatment plan for a radiation treatment of a subject;
a radiation treatment apparatus that includes a gantry and a radiation beam source mounted on the gantry, and is configured to irradiate the subject with a radiation beam from the radiation beam source in a case, where the subject is positioned along a rotational axis of the gantry;
a fluoroscopic image generation apparatus that is arranged approximately coaxially with the rotational axis and generates a fluoroscopic image of the subject; and
a radiation control apparatus that controls radiation of the radiation beam from the radiation beam source toward the subject, based on the treatment plan for the radiation treatment and the fluoroscopic image of the subject, wherein:
the treatment plan includes a computed tomography image at a specific respiratory phase of the subject and isocenter coordinates for specifying an irradiation position of the radiation beam at the specific respiratory phase of the subject;
the radiation control apparatus includes one or more processors and a memory storing computer-executable instructions configured to cause the one or more processor to function as:
a treatment plan acquiring section that acquires the treatment plan from the treatment planning apparatus;
a digitally reconstructed radiograph image generating section that generates a digitally reconstructed radiograph image of the subject for each prescribed angle of the gantry, based on the computed tomography image and the isocenter coordinates included in the acquired treatment plan;
a fluoroscopic image acquiring section that acquires the fluoroscopic image of the subject and a rotational angle of the gantry at a time when the fluoroscopic image of the subject was generated, from the fluoroscopic image generation apparatus;
a positional deviation calculating section that calculates a positional deviation between a position of a diaphragm of the subject in the generated digitally reconstructed radiograph image of the subject and a position of the diaphragm of the subject in the acquired fluoroscopic image of the subject, for a same rotational angle; and
a radiation permission determining section that permits radiation of the radiation beam from the radiation beam source toward the subject, when the positional deviation is less than or equal to a prescribed value; and
the positional deviation calculating section:
generates a plurality of shift images by shifting the fluoroscopic image of the subject by a prescribed increment along a craniocaudal direction of the subject, within a prescribed range in the craniocaudal direction;
calculates a normalized correlation coefficient between the digitally reconstructed radiograph image of the subject and each of the generated plurality of shift images; and
determines a shift amount of a shift image corresponding to a largest normalized correlation coefficient among a plurality of calculated normalized correlation coefficients, relative to the digitally reconstructed radiograph image of the subject in the craniocaudal direction, to be the positional deviation.

17. A radiation control method for controlling radiation of a radiation beam from a radiation beam source toward a subject, based on a treatment plan for the subject and a fluoroscopic image of the subject, wherein:
the treatment plan includes a computed tomography image at a specific respiratory phase of the subject and isocenter coordinates for specifying an irradiation position of the radiation beam at the specific respiratory phase of the subject;

the radiation beam source is mounted on a gantry, and is configured to irradiate the subject with the radiation beam when the subject is positioned along a rotational axis of the gantry; and the fluoroscopic image of the subject is generated by a fluoroscopic image generation apparatus arranged approximately coaxially with the rotational axis of the gantry;

the radiation control method comprises:
  a first step of acquiring the treatment plan;
  a second step of generating a digitally reconstructed radiograph image of the subject for each prescribed angle of the gantry, based on the computed tomography image and the isocenter coordinates included in the acquired treatment plan;
  a third step of acquiring the fluoroscopic image of the subject and a rotational angle of the gantry at a time when the fluoroscopic image of the subject was generated;
  a fourth step of calculating a positional deviation between a position of a diaphragm of the subject in the generated digitally reconstructed radiograph image of the subject and a position of the diaphragm of the subject in the acquired fluoroscopic image of the subject, for a same rotational angle; and
  a fifth step of permitting radiation of the radiation beam from the radiation beam source toward the subject, in a case where the positional deviation is less than or equal to a prescribed value; and the fourth step includes:
  generating a plurality of shift images by shifting the fluoroscopic image of the subject by a prescribed increment along a craniocaudal direction of the subject, within a prescribed range in the craniocaudal direction;
  calculating a normalized correlation coefficient between the digitally reconstructed radiograph image of the subject and each of the generated plurality of shift images; and
  determining a shift amount of a shift image corresponding to a largest normalized correlation coefficient among a plurality of calculated normalized correlation coefficients, relative to the digitally reconstructed radiograph image of the subject in the craniocaudal direction, to be the positional deviation.

18. A non-transitory storage medium storing a program that causes a computer to execute the radiation control method according to claim 17.

* * * * *